(12) United States Patent
Boualleg et al.

(10) Patent No.: US 10,786,802 B2
(45) Date of Patent: Sep. 29, 2020

(54) PROCESS FOR PREPARING AN ADSORBING MATERIAL COMPRISING A PRECIPITATING STEP OF BOEHMITE ACCORDING TO SPECIFIC CONDITIONS AND PROCESS FOR EXTRACTING LITHIUM FROM SALINE SOLUTIONS USING THIS MATERIAL

(71) Applicants: ERAMET, Paris (FR); IFP ENERGIES NOUVELLES, Rueil-Malmaison (FR)

(72) Inventors: Malika Boualleg, Villeurbanne (FR); Fabien Burdet, Plaisir (FR); Morgan Gohin, Saint Guinoux (FR)

(73) Assignees: ERAMET, Paris (FR); IFP ENERGIES NOUVELLES, Rueil-Malmaison (FR)

( * ) Notice: Subject to any disclaimer, the term of this patent is extended or adjusted under 35 U.S.C. 154(b) by 7 days.

(21) Appl. No.: 15/579,811

(22) PCT Filed: Jun. 3, 2016

(86) PCT No.: PCT/EP2016/062667
§ 371 (c)(1),
(2) Date: Dec. 5, 2017

(87) PCT Pub. No.: WO2016/193439
PCT Pub. Date: Dec. 8, 2016

(65) Prior Publication Data
US 2018/0353932 A1 Dec. 13, 2018

(30) Foreign Application Priority Data

Jun. 5, 2015 (FR) ...................... 15 55157

(51) Int. Cl.
*B01J 20/08* (2006.01)
*B01J 20/04* (2006.01)
(Continued)

(52) U.S. Cl.
CPC ............. *B01J 20/08* (2013.01); *B01J 20/041* (2013.01); *B01J 20/043* (2013.01); *B01J 20/045* (2013.01);
(Continued)

(58) Field of Classification Search
CPC ........ B01J 20/08; B01J 20/041; B01J 20/043; B01J 20/045; B01J 20/046; B01J 20/3007;
(Continued)

(56) References Cited

U.S. PATENT DOCUMENTS 4,348,297 A   9/1982 Bauman et al.
5,599,516 A   2/1997 Bauman et al.
(Continued)

FOREIGN PATENT DOCUMENTS

CN   1243112      2/2000
CN   1511964 A    7/2004
(Continued)

OTHER PUBLICATIONS

Vitaly Isupov et al: "Synthesis, Structure, Properties and Application of Aluminium Hydroxide Intercalation Compounds", Chemistry for Sustainable Development, Aug. 4, 2000 (Aug. 4, 2000), pp. 121-127, XP055135012, Retrieved from the Internet: URL:http://www.sibran.ru/upload/iblock/4be/4be336e1a48b9e7197eb4f1f8730b832.PDF [retrieved on Aug. 18, 2014] p. 121, right-hand column p. 122, right-hand column figure 2.
(Continued)

*Primary Examiner* — James A Fiorito
(74) *Attorney, Agent, or Firm* — B. Aaron Schulman. Esq.; Stites & Harbison, PLLC

(57) ABSTRACT

The present invention relates to the field of solid materials for adsorption of lithium. In particular, the present invention relates to a novel method for preparing a crystallized and
(Continued)

shaped solid material, preferably as extrudates, of formula $LiX_x \cdot 2Al(OH)_3, nH_2O$ with n being comprised between 0.01 and 10, x being equal to 1 when X is an anion selected from among chloride, hydroxide and nitrate anions, and x being equal to 0.5 when X is an anion selected from among sulfate and carbonate anions, comprising a step a) for precipitation of boehmite under specific temperature and pH conditions, at least one shaping step, preferably by extrusion, said method also comprising a final hydrothermal treatment step, the whole giving the possibility of increasing the adsorption capacity for lithium as well as the adsorption kinetics of the materials obtained as compared with the materials of the prior art when the latter is used in a method for extracting the lithium from saline solutions.

11 Claims, 9 Drawing Sheets

(51) Int. Cl.
| | | |
|---|---|---|
| *B01J 20/30* | (2006.01) | |
| *C01F 7/00* | (2006.01) | |
| *C01F 7/14* | (2006.01) | |
| *C01F 7/34* | (2006.01) | |
| *B01J 39/10* | (2006.01) | |
| *B01J 20/34* | (2006.01) | |

(52) U.S. Cl.
CPC ......... *B01J 20/046* (2013.01); *B01J 20/3007* (2013.01); *B01J 20/3071* (2013.01); *B01J 20/3078* (2013.01); *B01J 20/3085* (2013.01); *B01J 20/3433* (2013.01); *B01J 20/3475* (2013.01); *B01J 39/10* (2013.01); *C01F 7/002* (2013.01); *C01F 7/141* (2013.01); *C01F 7/34* (2013.01); *B01J 2220/58* (2013.01); *C01P 2002/72* (2013.01); *C01P 2004/64* (2013.01)

(58) Field of Classification Search
CPC ................ B01J 20/3071; B01J 20/3078; B01J 20/3085; B01J 20/3433; B01J 20/3475; B01J 39/10; C01F 7/002; C01F 7/141; C01F 7/34

See application file for complete search history.

(56) References Cited

U.S. PATENT DOCUMENTS

| 5,997,836 | A | 12/1999 | Sato et al. |
| 6,280,693 | B1 | 8/2001 | Bauman et al. |
| 2010/0172811 | A1 | 7/2010 | Geniesse |

FOREIGN PATENT DOCUMENTS

| CN | 101829538 A | 9/2010 |
| CN | 102631897 A | 8/2012 |
| EP | 0103034 | 3/1984 |
| FR | 3024445 | 2/2016 |
| RU | 2234367 | 8/2004 |
| WO | WO 94/19280 | 9/1994 |

OTHER PUBLICATIONS

Database WPI Week 199436 Thomson Scientific, London, GB; AN 1994-294183 XP002756839, & WO 94/19280 AI (Ekostar Res Prodn Stock Assoc) Sep. 1, 1994 (Sep. 1, 1994) abstract.
Isupov et al: "Aluminium hydroxide as selective sorbent of lithium salts from brines and technical solutions", Studies in Surface Science and Catalysis; Adsorption and its Applications in Industry and Environmental Protection—vol. I: Applications in Industry,, vol. 120, No. Part A, Jan. 1, 1999 (Jan. 1, 1999), pp. 621-652, XP008163815, ISSN: 0167-2991, DOI: 10.1016/S0167-2991(99)80567-9 [retrieved on Oct. 22, 2007] p. 646 figures 8-12,16,17 p. 636-p. 641 table 2.
Patrick Euzen et al: "Alumina" In: "Handbook of Porous solids", Apr. 25, 2008 (Apr. 25, 2008), Wiley-UCH Verlag GmbH, XP055057945, ISBN: 978-3-52-761828-6 pp. 1591-1677, DOI: 10.1002/9783527618286, p. 1602, paragraph 2eme—p. 1603, paragraph 2eme p. 1606-p. 1608.
Wu Z et al: "Study on the morphology of alpha-A1203 precursor prepared by precipitation method", Journal of Alloys and Compounds, Elsevier Sequoia, Lausanne, CH, vol. 467, No. 1-2, Jan. 7, 2009 (Jan. 7, 2009), pp. 600-604, XP025716633, ISSN: 0925-8388, DOI: 10.1016/J.JALLCOM.2007.12.092 [retrieved on Feb. 20, 2008] 2.1. Sample preparation; p. 600, right-hand column.
International Search Report for PCT/EP2016/062667, dated Sep. 1, 2016.
Written Opinion for PCT/EP2016/062667, dated Sep. 1, 2016.
Preliminary Search Report for FR 1555157, dated Apr. 21, 2016.

PROCESS FOR PREPARING AN ADSORBING MATERIAL COMPRISING A PRECIPITATING STEP OF BOEHMITE ACCORDING TO SPECIFIC CONDITIONS AND PROCESS FOR EXTRACTING LITHIUM FROM SALINE SOLUTIONS USING THIS MATERIAL

TECHNICAL FIELD

The present invention relates to the field of solid materials for adsorption of lithium. In particular, the present invention relates to a novel method for preparing a crystallized and shaped solid material, preferably as extrudates, of formula $LiX_x.2Al(OH)_3, nH_2O$ with n being comprised between 0.01 and 10, x being equal to 1 when X is an anion selected from among chloride, hydroxide and nitrate anions, and x being equal to 0.5 when X is an anion selected from among sulfate and carbonate anions, comprising a step a) for precipitating boehmite under specific temperature and pH conditions, at least one shaping step, preferably by extrusion, said method also comprising a final hydrothermal treatment step, the whole of the features of the method giving the possibility of increasing the adsorption capacity for the lithium as well as the adsorption kinetics of the materials obtained as compared with materials of the prior art when the latter is used in a method for extracting the lithium from saline solutions.

The present invention also relates to a method for extracting lithium from saline solutions using said crystallized solid material of formula $LiX_x.2Al(OH)_3, nH_2O$ with n, x and X having the aforementioned definition, prepared according to the novel preparation method according to the invention.

PRIOR ART

Lithium ions coexist with massive amounts of metals such as for example alkaline, earth-alkaline metals, boron and sulfates, in particular in saline solutions such as brines. Thus, they should be the subject of an economical and selective extraction from these saline solutions. Indeed, the chemical properties of lithium and of alkaline metals, preferably sodium (Na), and potassium (K) and earth-alkaline metals, preferably magnesium (Mg), calcium (Ca) and strontium (Sr), make the separation of these elements difficult.

The solid materials of formula $LiCl.2Al(OH)_3, nH_2O$ with n being comprised between 0.01 and 10 are known for their use in adsorption/desorption phenomena of lithium ions and in particular in the methods for extracting lithium from saline solutions. These not very stable structures would allow insertion of lithium atoms into the structure as well as the extraction of the lithium.

Several operating procedures leading to solids which may adsorb selectively lithium have been shown in the prior art. In every case, a solid aluminium trihydroxide $Al(OH)_3$, either prepared or commercially purchased, is put into contact with a lithium precursor. Three main precursors are used: the most used is lithium chloride (LiCl). A lithium hydroxide (LiOH) or a lithium carbonate ($Li_2CO_3$) may also be applied.

U.S. Pat. No. 6,280,693 describes a method for preparing a solid $LiCl/Al(OH)_3$ by adding an aqueous solution of LiOH to a polycrystalline alumina hydrate in order to form $LiOH/Al(OH)_3$, and thus creates active lithium sites in the crystalline layers of the alumina without altering the structure thereof. The transformation of $LiOH/Al(OH)_3$ into $LiCl/Al(OH)_3$ is thus achieved by adding diluted hydrochloric acid. The thereby prepared alumina pastes are then used in a method for extracting lithium from brines at high temperature. The extraction method for the lithium described in patent U.S. Pat. No. 6,280,693 uses the solid detailed below and comprises the steps hereafter:

a) Saturation of a solid bed with a brine containing a lithium salt LiX, X being selected from among halides, nitrates, sulfates and bicarbonates, b) Displacement of the impregnated brine with a concentrated NaX solution, c) Elution of the LiX salt captured by the solid by the passing of a non-saturated solution of LiX, d) Displacement of the impregnating material with a concentrated solution of NaX, the steps a) to d) are then repeated at least once.

Patent RU 2,234,367 describes a method for preparing a solid of formula $LiCl.2Al(OH)_3, nH_2O$ comprising a step for mixing aluminium trichloride ($AlCl_3$) and lithium carbonate ($Li_2CO_3$) in the presence of water at 40° C. The obtained residue is filtered and washed and then dried for 4 hours at 60° C. The thereby obtained solid is not shaped.

The obtained solid is used for extracting lithium contained in saline solutions by putting it into contact with water in order to remove a portion of the lithium and then by putting it into contact with a saline solution containing lithium. The thereby obtained static capacity is comprised between 6.0 and 8.0 mg of lithium per g of solid.

Patent CN1243112 describes a method for preparing a solid of formula $LiCl.2Al(OH)_3, nH_2O$ comprising a step for precipitating aluminium hydroxide $Al(OH)_3$ microcrystals by putting into contact with each other $AlCl_3$ and sodium hydroxide NaOH, and then putting it into contact with said microcrystals with a solution with 6% lithium chloride LiCl at 80° C. for 2 hours followed by filtration, rinsing and drying for obtaining a powder of $LiCl.2Al(OH)_3, nH_2O$ provided with a disordered and amorphous structure. A solution of macromolecular polymer selected from among fluorinated resins, polyvinyl chloride (PVC), chlorinated polyvinyl chloride (CPVC), ethylene perchlorate and cellulose acetate-butyrates (CAB) acting as a binder is then mixed to the powder of $LiCl.2Al(OH)_3, nH_2O$ in order to obtain a slurry which is then shaped by granulation followed by drying in air.

The use of such a solid in a method for extracting lithium from brines from salted lakes gives the possibility of obtaining a low Mg/Li ratio and a mother-liquor rich in lithium and compliant with the production standards of lithium carbonates or chlorides.

An object of the present invention is to provide a solid material allowing selective extraction of lithium from brine, said solid material being of good quality, without any apparent defect and having a good cohesion and good mechanical strength when the latter is put into contact with a brine solution or in water.

An object of the present invention is to provide a novel method for preparing such a solid material.

Another object of the present invention is to provide a method for extracting lithium from saline solutions using said solid material.

Another object of the present invention is to provide a solid material for applying a method for extracting lithium from saline solutions, wherein the solid material gives the possibility of limiting the generation of fine particles notably since the fine particles increase the pressure drop, promotes the generation of preferential routes and increase the renewal rate of the material upon having the brine pass through a bed of a material inside a column.

The applicants discovered a novel method for preparing a crystallized solid material of formula $LiX_x \cdot 2Al(OH)_3, nH_2O$ with n being comprised between 0.01 and 10, x being equal to 1 when X is an anion selected from among chloride, hydroxide and nitrate anions, and x being equal to 0.5 when X is an anion selected from among sulfate and carbonate anions, comprising a specific step combination and in particular the fact of carrying out both the step a) for precipitation of boehmite under specific temperature and pH conditions, the shaping step of a slurry, preferably by extrusion, after a drying step operating under specific conditions, the shaping step then being followed by another drying step also operating under specific conditions, and then carrying out a final hydrothermal treatment step of the shaped materials giving the possibility of obtaining a crystallized solid material of formula $LiX_x \cdot 2Al(OH)_3, nH_2O$ without any apparent defect having both good cohesion, good mechanical strength of the material when the latter is put into contact with a brine solution or in water and having an adsorption capacity for lithium as well as improved adsorption kinetics as compared with the materials of the prior art when the latter is used in a method for extracting lithium from saline solutions.

Without being bound to any theory, the applicants have demonstrated that by applying step a) of precipitation under operating temperature and pH conditions as defined according to the invention it is possible to obtain a precipitate of boehmite consisting of small sized crystallites. In particular, the obtained boehmite precipitate has a size, obtained by Scherrer's formula in X-ray diffraction along the crystallographic directions [020] and [120], respectively comprised between 0.5 and 10 nm and between 0.5 and 15 nm and preferably respectively comprised between 0.5 to 2 nm and between 0.5 to 3 nm and most preferably respectively between 0.5 and 1.5 nm and between 0.5 and 2.5 nm.

Scherrer's formula is a formula used in X-ray diffraction on powders or polycrystalline samples which relate a width at half-height of the diffraction peaks to the size of the crystallites. It is described in detail in reference: Appl. Cryst. (1978). 11, 102-113 Scherrer after sixty years: A survey and some new results in the determination of crystallite size, J. I. Langford and A. J. C. Wilson.

The method according to the invention comprising a precipitation step a) as claimed thereby gives the possibility of obtaining a crystallized solid final material of formula $LiX_x \cdot 2Al(OH)_3, nH_2O$, with n being comprised between 0.01 and 10, x having the aforementioned definition, also not very crystallized but having improved lithium adsorption capacity as well as adsorption kinetics as compared with the materials of the prior art when the latter is used in a method for extracting the lithium from saline solutions.

SUMMARY AND BENEFIT OF THE INVENTION

Preferably by «material of formula $LiX_x \cdot 2Al(OH)_3, nH_2O$» is meant a material essentially comprising or consisting in a crystallized phase of formula $LiX_x \cdot 2Al(OH)_3, nH_2O$, n, x and X having the aforementioned definition.

The object of the present invention is also a method for preparing a crystallized solid material of formula $LiX_x \cdot 2Al(OH)_3, nH_2O$ with n being comprised between 0.01 and 10, x being equal to 1 when X is an anion selected from among chloride, hydroxide and nitrate anions, and x being equal to 0.5 when X is an anion selected from among sulfate and carbonate anions, said method comprising at least the following steps:

a) a step for precipitating boehmite, in an aqueous medium, comprising contacting of at least one basic precursor preferably selected from among sodium aluminate, potassium aluminate, ammonia, sodium hydroxide and potassium hydroxide; and at least one acid precursor preferably selected from aluminium sulfate, aluminium chloride, aluminium nitrate, sulfuric acid, hydrochloric acid, and nitric acid, wherein at least one of the basic or acid precursors comprises aluminium, in order to obtain a suspension of boehmite, said step a) being applied at a temperature comprised between 5 and 35° C., and the amount of the basic precursor being selected so as to obtain a pH at the end of precipitation in the reaction medium comprised between 7.5 and 9.5, b) a step for washing and filtering the boehmite precipitate obtained in step a), c) a step for putting the precipitate obtained in step b) in contact with at least one lithium source, d) a step for filtering the suspension obtained in step c) in order to obtain a slurry, e) a step for drying the obtained slurry at the end of step d) at a temperature comprised between 20 and 80° C. for a period preferably comprised between 1 h and 12 h, f) a step for shaping said dried slurry, g) a step for drying the shaped material obtained at the end of step f) at a temperature comprised between 20 and 200° C., for a period preferably comprised between 1 and 20 hours, h) a hydrothermal treatment step of the dried shaped material obtained at the end of step g), at a temperature comprised between 50 and 200° C. and for a period preferably comprised between 30 min and 12 hours.

An advantage of the preparation method according to the invention is to allow the obtaining of a shaped crystallized solid material, preferably as extrudates, of formula $LiX_x \cdot 2Al(OH)_3, nH_2O$ with n, x and X having the aforementioned definition, good quality, without any apparent defect, and having good cohesion as well as improved mechanical strength when the latter is put into contact with a brine solution brine or with a diluted solution and preferably in water.

Another advantage of the present invention is to provide a method for preparing a shaped crystallized solid material, preferably as extrudates, of formula $LiX_x \cdot 2Al(OH)_3, nH_2O$ with n, x and X having the aforementioned definition, having an improved adsorption capacity for lithium as well as improved adsorption kinetics as compared with the materials of the prior art when the latter is used in a method for extracting the lithium from saline solutions.

The adsorption capacity of the aforementioned material is defined by the amount of adsorbed lithium, for a given solution. It is calculated by one skilled in the art by integrating the amount of lithium set from a piercing curve also called a leakage curve or saturation curve. The integration is performed on the volume by the lithium concentration difference between a solution after its loading on the aforementioned material and the theoretical concentration without any loading. This amount of material may be added to the amount of material used for obtaining a capacity in milligrams of lithium per gram of solid.

The adsorption kinetics of the aforementioned material is measured by one skilled in the art by studying the shape of a piercing curve also called leakage curve or saturation curve. This curve is obtained by means of a column filled with the adsorbent material in order to form a homogeneous bed, by percolating a saline solution containing lithium and measuring the concentration of lithium at the outlet of the adsorbent bed according to the volume of solution used for a given flow rate.

By improved adsorption capacity as compared with the materials of the prior art, an adsorption capacity of greater than 4.5 mg of Li/g of dry solid material is meant.

By dry solid material, is meant a solid material dried at 200° C. for 12 hours.

By «shaped», is meant that the material is solid and has sufficient cohesion when the solid is put into contact with a brine solution so that it does not substantially loose its physical integrity, i.e. it substantially retains its shape. More specifically, a shaped solid in the sense of the invention covers a solid retaining its cohesion under the conditions for extracting lithium as defined in the examples.

The cohesion as well as the mechanical strength of the shaped material, preferably by extrusion, prepared according to the invention are tested during the production of piercing curves also called leakage curves or saturation curves. A solid having good mechanical strength does not produce any fine particles and allows operation of the column without observing any clogging. A solid having poor mechanical strength produces fine particles which induce clogging of the column.

The cohesion as well as the mechanical strength of the shaped material, preferably by extrusion, prepared according to the invention are also tested via an accelerated ageing procedure on a stirring table, either in a brine, or in water.

The stirring table is driven with a horizontal unidirectional movement with an amplitude of 4 cm at a rate of 190 movements per minute. The shaped solids are thus stirred for a total period of 168 h.

At the end of these 168 h, the shaped solid mixture—brine or water is sieved by means of a grid with a mesh of 315 µm. And then the shaped solids remaining on the sieve are washed with the medium used during the stirring. The thereby obtained liquid fraction containing fin solid particles (a diameter of less than 315 µm) in suspension, is filtered by means of a Büchner equipped with a paper filter for which the pores have a size of 0.45 µm. The cake formed by the agglomeration of the fine particles is washed with demineralized water. The thereby obtained solid residue is dried in an oven at 50° C. until stabilization of the mass.

The ratio of the mass of solid residue over the initial mass of shaped solids is then calculated, giving access to a percentage of destruction of the shaped solids.

The percentage of destruction of the materials prepared according to the invention gives the possibility of appreciating the cohesion of said materials.

A good cohesion is notably obtained for materials for which the destruction percentage is less than 60%, and preferably less than 50%, when the latter are put into contact with a brine solution or any other diluted aqueous solution and in particular water.

The materials prepared according to the invention moreover have improved mechanical strength as compared with the materials of the prior art.

By «improved mechanical strength», is meant that the materials prepared according to the invention have a destruction percentage, when they are put into contact with a brine solution or with any other diluted aqueous solution and in particular water, of less than 30% and preferably less than 20%.

Another advantage of the preparation method according to the invention is to give the possibility of obtaining a shaped crystallized solid material, preferably as extrudates, of formula $LiX_x.2Al(OH)_3, nH_2O$ with n, x and X having the aforementioned definition having no or very few cracks which may cause swelling which is detrimental to the cohesion and to the mechanical strength of the material when the latter is put into contact with a brine solution or with a diluted solution and preferably in water.

The object of the present invention is also a method for extracting the lithium from saline solutions using said shaped crystallized solid material of formula $LiX_x.2Al(OH)_3, nH_2O$ with n being comprised between 0.01 and 10, x being equal to 1 when X is an anion selected from among chloride, hydroxide and nitrate anions, and x being equal to 0.5 when X is an anion selected from among sulfate and carbonate anions, prepared according to the novel preparation method according to the invention.

An advantage of the extraction method according to the invention is that it allows selective extraction of lithium from a saline solution and thus the obtaining of a high purification factor as compared with the initial saline solution, calculated as the X/Li ratio which is equal to the molar ratio of X/Li concentrations in the initial saline solution divided by the molar ratio of X/Li concentrations in the final solution, X being selected from sodium (Na), potassium (K), magnesium (Mg), calcium (Ca), boron (B), sulfur (S) and strontium (Sr).

The object of the present invention is also a crystallized solid material of formula $LiX_x.2Al(OH)_3, nH_2O$ with n being comprised between 0.01 and 10, x being equal to 1 when X is an anion selected from among chloride, hydroxide and nitrate anions, and x being equal to 0.5 when X is an anion selected from among sulfate and carbonate anions, preferably as extrudates, which may be obtained according to a method of the invention.

The object of the present invention is also a device for extracting lithium from saline solution(s). The device according to the invention thus applies the extraction method according to the invention.

DESCRIPTION OF THE INVENTION

According to the invention, the method comprises a step a) for precipitating boehmite, in an aqueous reaction medium, said step comprising the contacting of at least one basic precursor preferably selected from among sodium aluminate, potassium aluminate, ammonia, sodium hydroxide and potassium hydroxide; and of at least one acid precursor preferably selected from aluminium sulfate, aluminium trichloride, aluminium nitrate, sulfuric acid, hydrochloric acid, and nitric acid, wherein at least one of the basic or acid precursors comprises aluminium, in order to obtain a suspension of boehmite, said step a) being applied at a temperature comprised between 5 and 35° C., and the amount of the basic precursor being selected so as to obtain a pH at the end of precipitation in the reaction medium comprised between 7.5 and 9.5.

The mixing in the aqueous reaction medium of at least one basic precursor and of at least one acid precursor requires either that at least the basic precursor or the acid precursor comprises aluminium, or that both basic and acid precursors comprise aluminium.

Preferably, the basic precursor is sodium hydroxide (NaOH).

Preferably, the acid precursor is aluminium trichloride ($AlCl_3$).

Preferably, the basic and acid precursor(s) are added in said first precipitation step a) in aqueous solutions.

Preferably, the aqueous reaction medium is water.

Preferably, said step a) is applied with stirring.

Preferably, said step a) for precipitation of boehmite is applied at a temperature comprised between 5 and 30° C., and preferably between 10 and 30° C. and most preferably between 10 and 25° C., and the amount of the basic precursor being selected so as to obtain a pH at the end of precipitation in the reaction medium comprised between 7.5 and 9 and preferably between 7.7 and 8.8.

Preferably the precipitation step a) is applied for a period comprised between 10 minutes and 5 hours, preferably between 15 minutes and 2 hours.

Said precipitation step a) gives the possibility of obtaining a suspension of precipitated boehmite or aluminium oxyhydroxide (AlOOH).

The application of the precipitation step a) under the temperature and pH operating conditions as defined gives the possibility of obtaining a boehmite precipitate having small sized crystallites. By small sized crystallites is meant a boehmite precipitate consisting of crystallites for which the size, obtained by Scherrer's formula in X-ray diffraction along the crystallographic directions [020] and [120], is respectively comprised between 0.5 and 10 nm and between 0.5 and 15 nm and preferably respectively comprised between 0.5 to 2 nm and between 0.5 to 3 nm and most preferably respectively between 0.5 and 1.5 nm and between 0.5 and 2.5 nm.

According to the invention, the method comprises a step b) for washing and filtering the boehmite precipitate obtained at the end of step a).

Preferably said washing step is a step for washing with water.

According to the invention, the method comprises a step c) for putting the boehmite precipitate obtained in step b) in contact with at least one lithium source.

The lithium source(s) may be any compound comprising the lithium element and may release this element in an aqueous solution in a reactive form. Preferably, the lithium source(s) is (are) selected from among lithium salts and preferably from among lithium chloride (LiCl), lithium hydroxide (LiOH), lithium nitrate ($LiNO_3$), lithium sulfate ($Li_2SO_4$) and lithium carbonate ($Li_2CO_3$), taken alone or as a mixture.

Most preferably, the lithium source is lithium chloride (LiCl). In this case, X is the chloride anion and x=1.

Preferably, the boehmite precipitate obtained in step b) and at least one lithium source are mixed in the presence of water for obtaining a suspension in step c). Preferably, said mixing step c) is applied with intense stirring.

Preferably, said contacting step c) is carried out at a temperature comprised between 20 and 95° C. and preferably comprised between 50 and 95° C., and preferably between 70 and 95° C. for a period comprised between 15 minutes and 12 hours and preferably between 30 minutes and 5 hours.

According to the invention, the suspension obtained at the end of step c) undergoes a filtration step d) in order to obtain a slurry.

According to the invention, the slurry obtained at the end of step d) is dried in a drying step e) preferably at a temperature comprised between 20 and 80° C., for a period preferably comprised between 1 h and 12 h.

Preferably, said drying step is applied, preferably in an oven, at a temperature comprised between 20 and 60° C. and most preferably between 30 and 50° C., for a period comprised between 1 h and 10 h.

The operating conditions of said drying step e) give the possibility of obtaining a dried slurry having a loss on ignition (LOI) comprised between 45 and 75% and preferably between 50 and 70%. The loss on ignition obtained gives the possibility of shaping, preferably by extrusion, the dried slurry under good conditions and the obtaining of shaped materials, preferably as extrudates, resistant and without any apparent defect, i.e. without any crack.

In order to determine the LOI before the shaping step, a portion of the obtained slurry is sampled and put into the oven for 6 h at 200° C. The LOI is obtained by the difference between the mass of the sample before and after having passed in the oven.

According to the invention, said dried slurry obtained at the end of the drying step e) undergoes a shaping step f).

Preferably, said shaping step f) is carried out according to known methods to one skilled in the art, such as for example by extrusion, by tableting, by the drop coagulation method (oil-drop), by granulation with a rotating plate.

Preferably, said shaping step f) is carried out by extrusion. Most preferably, said step f) is carried out by direct extrusion or by kneading-extrusion.

By direct shaping of the dried slurry from step e) is meant a step in which said dried slurry does not undergo any intermediate steps between the drying step e) and its introduction into the extruder and in particular no kneading step.

By kneading—extrusion step is meant a step in which the dried slurry obtained at the end of the drying step e) undergoes a first kneading step, either in the presence or not of at least one binder or a binder precursor compound, and then the slurry is then subject to an extrusion step.

Said shaping step e) by kneading—extrusion is advantageously carried out in a way known to one skilled in the art.

Preferably, said dried slurry obtained at the end of the drying step e), and optionally at least said binder or binder precursor, in the case when the latter are present, are mixed, preferably in one go, in a kneader. The kneader is advantageously selected from batch kneaders, for example with cam arms and with Z-shaped arms, or else by means of a twin-screw kneader-mixer. The kneading conditions are adjusted in a way known to one skilled in the art and aim at obtaining a homogenous and extrudable slurry.

In the kneading—extrusion methods known to one skilled in the art, the extrudability of the slurry may optionally advantageously be adjusted by adding water and/or acid in solution, in order to obtain a slurry adapted to carrying out the shaping step e) by extrusion. In the case when the acid is added, a neutralization step is generally applied. These methods are called acid/basic kneading—extrusion methods.

According to a first embodiment of step f), said shaping step f) may advantageously be directly applied after the drying step e).

Preferably, the step f) for direct shaping of the dried slurry is applied in the absence of any binder selected from among inorganic binders, such as for example hydraulic binders or inorganic binders which may be generated under the conditions of said step e) by adding precursors of inorganic binders, and organic binders, such as for example paraffins or polymers.

In this case, said dried slurry preferably does not undergo any intermediate step between said drying step e) and said shaping step f) by extrusion, and preferably no kneading step and most preferably no acid/basic kneading step. Thus, more preferably, said shaping step f) according to the first embodiment is carried out without adding any acid or base to the dried slurry introduced into said step f).

Said shaping step f) by direct extrusion is advantageously carried out in a way known to one skilled in the art.

In particular, the dried slurry from the drying step e) advantageously passes through a die, for example by means of a piston or a twin-screw or single-screw continuous extruder. The diameter of the die of the extruder is advantageously variable and is comprised between 0.5 and 5 mm, preferably between 0.5 and 3 mm and preferably between 0.5 and 2 mm. The shape of the die, and therefore the shape of the material obtained as an extrudate, is advantageously cylindrical, for example with a circular, trilobed, quadrilobed or else multilobed cross-section.

According to a second embodiment of step f), said shaping step f) may advantageously be applied by kneading—extrusion in the presence of at least one binder selected from among organic or inorganic binders and preferably without adding any acid or base to the dried slurry introduced into said step f).

In said second embodiment of step f), the kneading step is preferably carried out without adding any acid or base. Thus, no acidification or neutralization step for the dried slurry is applied in the shaping step e) by kneading—extrusion according to the invention.

The slurry then advantageously passes through a die, for example by means of a piston or a twin-screw or single-screw continuous extruder. The diameter of the die of the extruder is advantageously variable and is comprised between 0.5 and 5 mm, preferably between 0.5 and 3 mm and preferably between 0.5 and 2 mm. The shape of the die, and therefore the shape of the material obtained as an extrudate, is advantageously cylindrical, for example with a circular trilobed, quadrilobed or else multilobed cross-section.

Said organic binder(s) which may be used in said shaping step d) are advantageously selected from among paraffins, and polymers, taken alone or as a mixture.

Preferably, said organic binder(s) is(are) selected from among polyvinylpyrrolidone (PVP), polyvinyl alcohol (PVA), an aqueous dispersion of a mixture of paraffin and polyethylene waxes such as for example Cerfobol R75, polysaccharides, methylcellulose, hydroxypropylmethylcellulose, hydroxyethylcellulose and carboxymethylcellulose and taken alone or as a mixture, preferably from among polyvinylpyrrolidone (PVP), polyvinyl alcohol (PVA) and an aqueous dispersion of a mixture of paraffin and polyethylene waxes such as for example Cerfobol R75, and preferably from among polyvinylpyrrolidone (PVP) and polyvinyl alcohol (PVA).

A highly preferred organic binder is polyvinylpyrrolidone (PVP).

Cerfobol R75 comprises 28.4% of a dry paraffin organic mass diluted in an aqueous phase.

The proportion of said organic binder(s) added in said shaping step e) is advantageously comprised between 0.5 and 20% by mass, preferably between 0.5 and 15% by mass, preferably between 1 and 13% by mass, based on the total mass of dry slurry to be shaped.

The addition of at least one organic binder in said step d) facilitates the shaping by extrusion of step e) of the method according to the invention.

The addition of at least one organic binder in said step e) also gives the possibility of obtaining a crystallized solid material as extrudates having improved strength during stirring in contact with the brine.

Preferably, said inorganic binder(s) used in said shaping step e) are advantageously selected from silicic binders, binders of the clay type and inorganic binders which may be generated under the conditions of said step e) by adding precursors of inorganic binders.

Preferably, said inorganic binder(s) used in said shaping step e) are advantageously selected from silicic binders.

Preferably, the silicic binders are advantageously selected from among precipitation silica and silica from by-products such as flying ashes such as for example silico-aluminous or silico-calcium particles, silicic acid, sodium metasilicate and silica fumes. Colloidal silica, for example appearing as a stabilized suspension, such as for example the commercial products such as le Ludox® or Klebosol® may also be used. Preferably, the silicic binder is in an amorphous or crystalline form. Most preferably, the silica is used as a powder or in colloidal form.

The proportion of said inorganic binder(s) added in said shaping step d) is advantageously comprised between 0.5 and 20% by mass, preferably between 0.5 and 15% by mass, preferably between 1 and 13% by mass, based on the total mass of dry slurry to be shaped.

The addition of at least one inorganic binder in said step e) facilitates its shaping by extrusion.

The addition of at least one inorganic binder in said step e) also gives the possibility of obtaining a shaped crystallized solid material, preferably as extrudates having improved strength with stirring in contact with the brine.

In the case when said step e) is applied by kneading—extrusion in the presence of at least one binder selected from inorganic binders which may be generated under the conditions of said step e), said shaping step e) for the dried slurry is advantageously carried out in the presence of a binding formulation comprising and preferably consisting of at least one solid precursor of alumina and of at least one acid in solution in proportions such that the acid/Al molar ratio is comprised between 0.01 and 1.2.

The introduction into the shaping step f), of a solid precursor of alumina and of an acid in solution allows the generation in situ of a mineral binder resulting from the reaction of the alumina precursor and of the introduced acid, during said shaping step.

Moreover, the solid alumina precursor and the acid in solution should be introduced into said step f) in the proportions as described.

The generation of said mineral binder resulting from the reaction of the solid alumina precursor and of the introduced acid requires the use of a solid precursor of alumina capable of being in majority dispersed or in majority dissolved in the acid solution used.

The alumina solid precursor is advantageously selected from among aluminium oxides, aluminium hydroxides and aluminium oxyhydroxides soluble or dispersible in the solution of phosphoric acid, preferably from among aluminium hydroxides and aluminium oxyhydroxides. Most preferably, said solid precursor of alumina is an aluminium oxyhydroxide and more preferably said solid precursor of alumina is boehmite or pseudo-boehmite.

The solid precursor of alumina advantageously appears as a powder consisting of solid particles having an average diameter, as determined by laser diffraction grain size measurement (granulometer Mastersizer from Malvern), comprised between 9 and 80 µm, preferably comprised between 10 and 60 µm and preferably between 15 and 45 µm. The particles of the solid precursor of alumina advantageously consist of agglomerates of elementary units so called crystallites, for which the dimensions are advantageously comprised between 2 and 150 nm, preferably between 4 and 150 nm and preferably between 4 and 100 nm as determined by transmission electron microscopy (TEM). The morphology of the crystallites, the size and how the crystallites are organized, mainly depend on the synthesis of route of the alumina precursor used for preparing said micrometric particles.

Preferably, the proportion of the solid precursor of alumina added in step f) is comprised between 0.5 and 50% by mass based on the dry slurry mass to be shaped, preferably between 2 and 30% by mass, and preferably between 3 and 25% by mass.

In this embodiment, at least one acid in solution is introduced into the mixture. Preferably, the acid is selected from among phosphoric acid, hydrochloric acid, nitric acid, acetic acid and citric acid, alone or as a mixture. Most preferably, the acid is phosphoric acid.

Phosphoric acid is also called orthophosphoric acid.

The role of the acid solution is to promote the formation of an amorphous phase of mineral binder resulting from the reaction with the solid precursor of alumina. In this way, the particles of the solid precursor of alumina become, with the action of the acid and of the mechanical energy provided during the shaping step f) an amorphous phase of a mineral binder.

Preferably, the acid(s) in solution is (are) introduced in proportions such that the acid/Al molar ratio is comprised between 0.01 and 1.2, and preferably between 0.03 and 1.

In the case when the introduced acid is phosphoric acid, it is introduced into solution in proportions such that the P/Al molar ratio is comprised between 0.01 and 1.2, preferably between 0.3 and 1.0.

In the molar ratio P/Al, P stems from the introduced phosphoric acid and Al stems from the solid alumina precursor.

The specific molar ratio P/Al as claimed, corresponds to a proportion of phosphoric acid such that the ratio of the mass of introduced acid over the mass of the solid precursor of alumina introduced is comprised between 30 and 225% by mass, preferably between 59 and 170% by mass and preferably.

The use of an acid/Al molar ratio comprised between 0.01 and 1.2, characteristic of a dissolution with a high acid ratio, in the shaping step d) gives the possibility both of forming the amorphous phase of mineral binder resulting from the reaction with the solid precursor of alumina, but also of facilitating the shaping by extrusion and increasing the cohesion and the mechanical strength of the extrudates obtained according to this embodiment.

According to the invention, the shaped material and preferably the obtained extrudates at the end of step d) undergo a drying step g) at a temperature comprised between 20 and 200° C. for a period preferably comprised between 1 hour and 20 hours, in order to obtain the crystallized solid material of formula $LiX_x.2Al(OH)_3, nH_2O$, shaped, preferably as extrudates.

Preferably, said drying step g) is applied at a temperature comprised between 20 and 100° C., preferably between 20 and 80° C. and most preferably between 20 and 60° C., preferably for a period preferably comprised between 1 and 18 hours, preferably between 5 and 14 hours and preferably between 8 and 14 hours.

The specific conditions of said drying step e) gives the possibility of obtaining a crystallized solid material having the desired $LiX_x.2Al(OH)_3, nH_2O$ phase.

Said drying step g) is advantageously carried out according to techniques known to one skilled in the art and preferably in an oven.

According to the invention, the dried-shaped material and preferably the extrudates obtained at the end of step g) are subject to a hydrothermal treatment step at a temperature comprised between 50 and 200° C. and for a period preferably comprised between 30 min and 12 hours.

Preferably, said step h) is applied at a temperature comprised between 70 and 200° C., preferably between 70 and 180° C., and most preferably between 80 and 150° C., for example for a period comprised between 30 minutes and 120 hours.

Said hydrothermal treatment step h) is advantageously carried out according to a technique known to one skilled in the art.

According to a preferred embodiment, said step h) is carried out in an autoclave, under an autogenous pressure and under an atmosphere saturated with water. Preferably, said step h) is carried out by introducing a liquid at the bottom of the autoclave, said liquid being selected from among water, alone or mixed with at least one acid, one base or a lithium salt. Preferably, the shaped and dried material and preferably the obtained extrudates at the end of step g) are not in contact with the liquid at the bottom of the autoclave.

In the case when the water is introduced into the autoclave in a mixture with an acid, the acid is advantageously selected from among nitric acid, hydrochloric acid, sulfuric acid and carboxylic acid.

In the case when the water is introduced into the autoclave in a mixture with a base, the base is advantageously selected from among lithium hydroxide, sodium hydroxide, potassium hydroxide and ammonia.

In the case when the water is introduced into the autoclave as a mixture with a lithium salt, the lithium salt is advantageously selected from among lithium chloride and lithium carbonate.

Preferably, said step h) is applied in the presence of a humid atmosphere comprising a water content comprised between 20 and 100% by mass, and preferably between 50 and 100% by mass, and preferably between 80 and 100% by mass based on the total mass of the atmosphere in the autoclave.

According to an embodiment, said step h) may be carried out in a weathering oven, in the presence of a humid air flow containing between 20 and 100% by mass of water preferably between 50 and 100% by mass and preferably between 80 and 100% by mass of water, or in an oven operating under a humid air flow containing between 20 and 100% by mass of water preferably between 50 and 100% by mass and preferably between 80 and 100% by mass of water according to methods known to one skilled in the art.

The hydrothermal treatment step h) in a controlled atmosphere gives the possibility of obtaining a crystallized solid material of formula $LiX_x.2Al(OH)_3, nH_2O$ with n being comprised between 0.01 and 10, x being equal to 1 when X is an anion selected from among chloride, hydroxide and nitrate anions, and x being equal to 0.5 when X is an anion selected from among sulfate and carbonate anions preferably shaped as extrudates, having good cohesion and good mechanical strength when the latter is placed in contact with a brine or a diluted solution and preferably water.

At the end of this step h), the material, preferably shaped as extrudates obtained, is then advantageously recovered and may optionally be washed.

Said shaped material and preferably the extrudates obtained at the end of step h) may then optionally be subject to a drying step i), said drying step preferably operating at a temperature comprised between 15 and 50° C. for a period preferably comprised between 1 h and 12 hours in order to obtain the crystallized solid material of formula $LiX_x.2Al(OH)_3, nH_2O$ with n being comprised between 0.01 and 10, x being equal to 1 when X is an anion selected from among chloride, hydroxide and nitrate anions, and x being equal to 0.5 when X is an anion selected from among shaped sulfate and carbonate anions.

Said drying step i) is advantageously carried out according to techniques known to one skilled in the art, and preferably in an oven.

The method according to the present invention therefore gives the possibility of obtaining a crystallized solid material of formula $LiX_x.2Al(OH)_3,nH_2O$ with n being comprised between 0.01 and 10, preferably between 0.1 and 5 and preferably between 0.1 and 1, x being equal to 1 when X is an anion selected among from among chloride, hydroxide and nitrate anions, and x being equal to 0.5 when X is an anion selected from among sulfate and carbonate anions, preferably as extrudates with a section (greatest dimension of the cross-section) or diameter comprised between 0.2 and 5 mm, preferably between 0.3 and 4 mm, preferably between 0.3 and 3 mm, most preferably between 0.3 and 2 mm and still most preferably between 0.3 and 1.8 mm.

The best results in terms of mechanical strength and cohesion of the crystallized solid material obtained according to the preparation method according to the invention are obtained in the case of extrudates with a section (largest dimension of the cross-section) or diameter comprised between 0.2 and 5 mm and preferably comprised between 0.3 and 1.8 mm, said extrudates having been obtained by means of the combination of a specific shaping step as described above and a final drying step i) carried out at a temperature comprised between 20 and 200° C., preferably comprised between 20 and 60° C. and in particular at 40° C., for a period preferably comprised between 1 and 20 hours, preferably comprised between 5 and 14 hours, preferably between 8 and 14 hours and in particular for 8 hours.

The crystallized solid material of formula $LiX_x.2Al(OH)_3,nH_2O$ shaped, preferably as extrudates, prepared according to the sequence of steps a) to i) of the preparation method according to the invention may be characterized according to the following techniques: nitrogen adsorption for determining the specific surface area according to the BET method; X-ray diffractometry in the diffraction angle range $2\theta=0.8$ to $40°\pm0.02°$ in a reflection geometry in order to identify the structure of said material and for elementary analysis.

The crystallized solid material of formula $LiX_x.2Al(OH)_3,nH_2O$ shaped preferably as extrudates, advantageously has a specific surface area measured according to the BET method comprised between 1 and 30 $m^2/g$ and preferably between 1 and 20 $m^2/g$.

The X-ray diffraction diagram of the material as extrudates corresponds to a crystallized solid of formula $LiX_x.2Al(OH)_3,nH_2O$ according to the sheet JCPDS no. 0031-07-00, with n being comprised between 0.01 and 10, preferably between 0.1 and 0.5 preferably between 0.1 and 5 and most preferably between 0.1 and 1, obtained according to the invention, shaped, advantageously as extrudates.

The preparation method according to the present invention therefore gives the possibility of obtaining a crystallized solid material of formula $LiX_x.2Al(OH)_3,nH_2O$, n, x and X having the aforementioned definition preferably shaped as extrudates, having both a low specific surface area BET, good cohesion, and not having any apparent defect and having a good cohesion and a good mechanical strength when the latter is placed in contact with a brine or with a diluted solution and preferably in water.

The good properties of the obtained material result from the combined effect of shaping preferably by extrusion a slurry, in the absence of any binder, directly, after a drying step operating under specific conditions, of the application of a drying step following the shaping, also operating under specific conditions and also of the application of a final hydrothermal treatment step preferably operating in an autoclave.

Moreover, the shaped crystallized solid material, preferably as extrudates, thereby obtained, of formula $LiX_x.2Al(OH)_3,nH_2O$ with n, x and X having the aforementioned definition, has a capacity of adsorbing lithium as well as improved adsorption kinetics as compared with the materials of the prior art when the latter is used in a method for extracting lithium from saline solutions.

The obtained materials according to the invention have improved adsorption capacity as compared with the materials of the prior art, greater than 4.5 mg of Li/g of dry solid material, i.e. a solid material dried at 200° C., preferably comprised between 4.5 and 10 mg of Li/g, preferably between 4.5 and 8 and most preferably between 4.5 and 7 mg of Li/g of dry solid material.

The object of the present invention is also a method for extracting the lithium from a saline solution using said crystallized solid material of formula $LiX_x.2Al(OH)_3,nH_2O$ with n being comprised between 0.01 and 10, x being equal to 1 when X is an anion selected from among chloride, hydroxide and nitrate anions, and x being equal to 0.5 when X is an anion selected from among sulfate and carbonate anions, prepared according to the invention.

Said saline solution used in the extraction method according to the invention advantageously comprises a lithium concentration comprised between 0.001 mol/L and 0.5 mol/L, preferably between 0.02 mol/L and 0.3 mol/L.

Said saline solution also contains other species, such as for example the species selected from the following list: Na, K, Rb, Cs, Mg, Ca, Sr, Ba, F, Cl, Br, I, $SO_4$, $CO_3$, $NO_3$, and $HCO_3$. Said saline solution may advantageously be saturated with salts or not.

Said saline solution may be any natural saline solution, concentrated or stemming from a method for extraction or transformation of lithium. For example, said saline solution used in the extraction method according to the invention may advantageously be selected from brines of salted lakes or geothermal sources, the brines being subject to evaporation for obtaining concentrated lithium brines, sea water, effluents of cathode production factories, or factories for producing lithium chloride or hydroxide and effluents from the methods for extracting lithium from minerals.

The method for extracting lithium according to the invention is preferably a selective extraction method for lithium. Indeed, it allows separation of lithium from alkaline metals, preferably sodium (Na), and potassium (K) and from earth-alkaline metals, preferably magnesium (Mg), calcium (Ca) and strontium (Sr), present in a massive amount in the saline solutions treated in said extraction method.

The method for extracting lithium according to the invention also allows selective separation of lithium from the other compounds such as boron and sulfates.

The method for extracting the lithium according to the invention is advantageously applied in a unit comprising at least one column, said column(s) comprising at least one bed of said crystallized solid material of formula $LiX_x.2Al(OH)_3,nH_2O$, with n, x and X having the aforementioned definition, shaped and prepared according to the preparation method according to the invention.

Preferably, said method for extracting the lithium according to the invention is applied in a unit comprising at least two columns, and preferably between two and three columns, at least comprising one bed of the crystallized solid material of formula $LiX_x \cdot 2Al(OH)_3, nH_2O$, with n, x and X having the aforementioned definition.

Said method for extracting lithium advantageously comprises at least the following steps:
- a step for activating said crystallized solid material of formula $LiX_x \cdot 2Al(OH)_3, nH_2O$, with n, x and X having the aforementioned definition,
- a step for loading said material activated by adsorption carried out by having said saline solution pass over said activated material,
- at least one step for washing the saline solution impregnating said material by having a washing solution pass over said material,
- a step for desorption of the lithium achieved by having water or a lithium salt aqueous solution pass over said material in order to obtain an eluate comprising at least lithium.

Preferably, the method for extracting lithium according to the invention comprises a preliminary step for putting said material into a column.

Preferably, said step for activating the crystallized solid material of formula $LiX_x \cdot 2Al(OH)_3, nH_2O$, with n, x and X having the aforementioned definition, preferably shaped, and preferably as extrudates, is carried out in one go during the putting of the synthesized material in a column and shaped according to the preparation method according to the invention.

Said activation step gives the possibility of activating the sites intended to selectively adsorb the lithium.

Preferably, said activation step is advantageously carried out by the upward or downward passing, and preferably downward passing, of an activation solution selected from water and a lithium salt solution having a concentration comprised between 0.001 mol/L and 0.1 mol/L, preferably between 0.001 mol/L and 0.05 mol/L and preferably between 0.01 and 0.04 mol/L.

Preferably, the lithium salt used in solution in said activation step is selected from among lithium chloride (LiCl), lithium nitrate and lithium bromide.

Most preferably, the lithium salt used in solution in said activation step is lithium chloride (LiCl).

Said activation step is advantageously carried out at a temperature comprised between 0° C. and 90° C., and preferably between 10° C. and 60° C., and preferably between 10° C. and 30° C. with a dwelling time of said activation solution in the column preferably comprised between 0.03 and 10 h, and preferably between 0.06 and 1 h.

The amount of solution required for activation is advantageously comprised between 1 and 30 volumes of column, preferably between 2 and 20 column volumes.

The column volume or «Bed Volume» is also called a volume occupied by the bed of the solid in the column or BV according to the terminology specific to the technical field known to one skilled in the art.

Said activated crystallized solid material may optionally be subject at the end of the activation step to a washing step with a washing solution and preferably a solution of lithium chloride (LiCl).

Said step for loading said activated material by adsorption is advantageously carried out by the upward or downward passing, and preferably upward passing of the saline solution treated in the extraction method according to the invention, over said activated material.

Advantageously, said loading step is advantageously carried out at a temperature comprised between 0° C. and 90° C., and preferably between 10° C. and 70° C. with a dwelling time of said solution, preferably of said treated saline solution, in the column preferably comprised between 0.03 and 10 h, and preferably between 0.06 and 1 h.

Preferably, the amount of solution required for saturating said material depends on the adsorption capacity of said material and on the lithium concentration of the saline solution.

The adsorption capacity of the materials according to the invention is greater than 4.5 mg of Li/g of dry solid material, preferably comprised between 4.5 and 10 mg of Li/g, preferably between 4.5 and 8 and most preferably between 4.5 and 7 mg of Li/g of dry solid material.

In the case when said method for extracting lithium according to the invention is applied in a unit comprising two columns, the first column is advantageously saturated with lithium during said loading step. The second column receiving the output flow from the first column, is advantageously loaded until a lithium leak not exceeding 10% of the lithium concentration of the input flow and preferably 5% is obtained thereby allowing maximization of the recovery yield of lithium.

In the case when said method for extracting lithium according to the invention is applied in a unit comprising three columns, the third column, already saturated with lithium, is dedicated to the washing and then lithium desorption steps, described hereafter, during the loading of the other two columns.

The first fraction of the output flow of said loading step by adsorption, advantageously between 0 and 1 column volume, corresponds to the removal of the impregnating substance stemming from the step for activation of the solid material. This fraction may be considered as an effluent or a recycled fraction, and preferably recycled as an input flow of the desorption step. In the case of the treatment of a natural brine or sea water, beyond 1 column volume, the entirety of the output flow of said loading step by adsorption, hereafter called a raffinate which has not undergone any chemical treatment, is advantageously and preferably sent back to the original saline solution deposit.

At the end of the loading step by having the saline solution treated in the method according to the invention pass over the activated material, the saline solution impregnates said activated material.

The saline solution impregnating the activated material is then washed during at least one washing step by having a washing solution pass over said material.

Said washing step(s) of the saline solution impregnating said material, is (are) advantageously carried out by the upward or downward passing of a washing solution over said material, and preferably downwards.

Preferably, said washing solution is selected from water and an aqueous solution of a sodium salt and preferably of sodium chloride (NaCl), optionally comprising a lithium salt and preferably lithium chloride (LiCl), said solution advantageously having a sodium salt concentration and preferably a sodium chloride (NaCl) concentration, of greater than 0.5 mol/L, preferably comprised between 2 mol/L and saturation and a lithium salt concentration and preferably a lithium chloride (LiCl) concentration, comprised between 0 mol/L and 2 mol/L.

According to a preferred embodiment, said saline solution impregnating the activated material is subject to a final washing step finale by having an aqueous washing solution of sodium chloride (NaCl) optionally comprising lithium chloride (LiCl), pass over said material.

Said washing step is advantageously carried out at a temperature comprised between 0° C. and 90° C., and preferably between 10° C. and 70° C., and with a dwelling time of said solution, preferably of said washing solution in the column comprised between 0.03 and 10 h, and preferably between 0.06 and 1 h. The amount of solution required for washing is comprised between 0.1 and 10 column volumes and preferably in the range from 0.5 to 5 column volumes.

The output flow of said washing step is considered as an effluent or is advantageously recycled, and preferably recycled to the input of the loading step or directly to the input of the second column in the case when said extraction method of lithium according to the invention is applied in a unit comprising at least two columns.

Said washing step allows washing of the saline solution impregnated in said material during the step for loading said material by adsorption, while limiting desorption of the lithium.

In the case when said washing solution is a concentrated aqueous solution of sodium chloride (NaCl), said washing step not only allows removal of the saline solution impregnated in said material during the step for loading said material by adsorption but also desorption of the elements such as boron, sulfates, alkaline metals other than lithium and sodium and earth-alkaline metals.

The step for desorption of the lithium is then carried out by having water or an aqueous solution of lithium chloride (LiCl) pass over said material at the end of the washing step in order to obtain an eluate comprising at least lithium.

Preferably, said desorption step is carried out by an upward or downward, and preferably downward passing of a desorption solution selected from water and a lithium chloride (LiCl) solution containing 0.001 mol/L to 2 mol/L of LiCl, and preferably from 0.01 mol/L to 1 mol/L.

Said desorption step is advantageously carried out at a temperature comprised between 0° C. and 90° C., and preferably between 10° C. and 70° C. with a dwelling time of said desorption solution in the column preferably comprised between 0.03 and 10 h, and preferably between 0.06 and 1 h.

The amount of lithium chloride (LiCl) solution required for desorption is advantageously comprised between 0.01 and 10 column volumes, and preferably between 0.05 and 5 column volumes.

The output flow of said lithium desorption step generates the final product of the method, called an eluate.

The eluate is advantageously recovered between 0 and 4 column volumes, and preferably between 0.2 and 3 column volumes.

The whole of the other fractions of the output flow of this step not making up the final product called an eluate, is considered as an effluent or is advantageously recycled, and preferably recycled to the inlet of the washing step or of the loading step.

The eluate obtained at the end of the extraction method according to the invention is a solution in majority containing the elements Li, Na and Cl as well as impurities preferably selected from among K, Mg, Ca, Sr, B or $SO_4$.

The eluate is then advantageously concentrated and then purified in order to obtain a high purity lithium salt.

Said extraction method of the lithium according to the invention allows selective extraction of lithium from a saline solution and thus gives the possibility of obtaining a high purification factor relatively to the initial saline solution, calculated as being the X/Li ratio which is equal to the X/Li concentration molar ratio in the initial saline solution divided by the X/Li concentration molar ratio in the eluate, X being selected from sodium (Na), potassium (K), magnesium (Mg), calcium (Ca), boron (B), sulfur (S) and strontium (Sr).

The present invention also covers a lithium extraction device characterizing that it comprises a unit comprising at least one column, said column comprising at least packing comprising the crystallized solid material of formula $LiX_x \cdot 2Al(OH)_3 \cdot nH_2O$ with n being comprised between 0.01 and 10, x being equal to 1 when X is an anion selected from among chloride, hydroxide and nitrate anions, and x is equal to 0.5 when X is an anion selected from among sulfate and carbonate anions, as defined according to the present invention.

More particularly, the invention relates to a device applying the lithium extraction method according to the invention. Still more specifically, the device of the present invention comprises units or means applying the various steps of the lithium extraction method according to the invention.

By «according to the invention» or equivalent terms, are meant those which cover any embodiment, alternative, advantageous feature or preferred feature, taken alone or according to any of their combinations, without any limitation.

The invention is illustrated by the following Examples which by no means have any limiting nature.

EXAMPLES

Example 1

According to the Invention

A solid material of formula $LiCl \cdot 2Al(OH)_3 \cdot nH_2O$ with n being comprised between 0.01 and 1, is prepared according to a synthesis method according to the invention, wherein the shaping step is applied by direct extrusion, without any binder.

1/Precipitation of Boehmite AlOOH

In a beaker cooled with an ice bath, a solution containing 326 ml of permuted water and 135.6 g of aluminium chloride hexahydrate ($AlCl_3$) is prepared. Next with magnetic stirring, 67.5 g of sodium hydroxide (NaOH) are added for 30 minutes so as to adjust the pH. The pH attained at the end of the synthesis is 8. The temperature is maintained to 20° C. during the whole duration of the precipitation step. This cake is suspended in a 3 L beaker with 320 mL of water.

Figure 1:
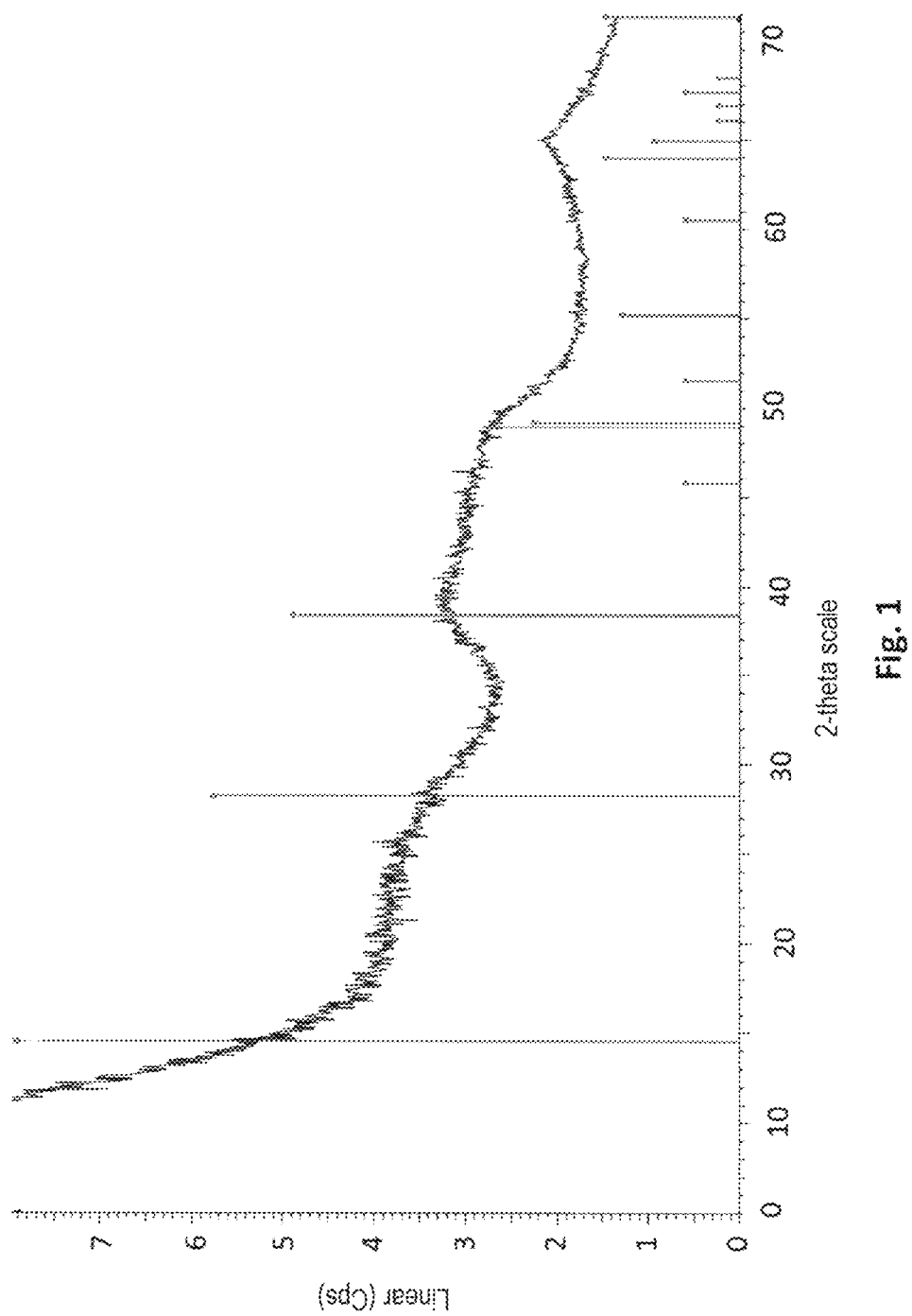
FIGS. 1, 3, 5 and 7 illustrate X-ray diffraction diagrams of the precipitated boehmites respectively obtained in Examples 1 and 2 according to the invention and the non-complaint Examples 3 and 4 of the invention.

A sample of the obtained precipitate is taken from the reaction medium. XRD (FIG. 1) of the precipitate shows that the precipite obtained in Example 1 is actually a boehmite precipitate. The boehmite precipitate obtained in Example 1 is not very crystallized.

The size of the crystallites of the obtained boehmite is measured according to Sherrer's method:

Size along [020]=0.6±0.1 (nm); Size along [120]=1.4±0.1 (nm)

2/Addition of Lithium Chloride LiCl.

A solution is prepared containing 78.5 g of lithium chloride LiCl provided by Prolabo and 1,326 ml of water which is added to the repulped cake. This reaction medium is stirred and heated at 80° C. for 2 h.

Filtration and then drying in an oven at 80° C. for 8 h follow the first 2 steps.

The thereby prepared solid material is characterized by the formula $LiCl.2Al(OH)_3,nH_2O$ with n=0.25 according to a synthesis method compliant with the invention. The step for shaping the obtained slurry is directly carried out after the drying step, without any preliminary kneading step and in the absence of any binder. The obtained slurry is shaped by means of a piston extruder (MTS), equipped with a cylindrical die with a diameter of 1 mm.

The extrudates obtained at the end of the shaping step are then dried in an oven at 40° C. for 12 h.

The obtained extrudates are then subject to a hydrothermal treatment step in an autoclave comprising water. 10 g of extrudates are placed in a basket placed in a 500 ml autoclave. In the bottom of the autoclave 20 g of distilled water are placed. The extrudates are not in contact with the liquid at the bottom of the autoclave.

The hydrothermal treatment is performed at a temperature of 100° C. for 6 h under an atmosphere saturated with water.

Figure 2:
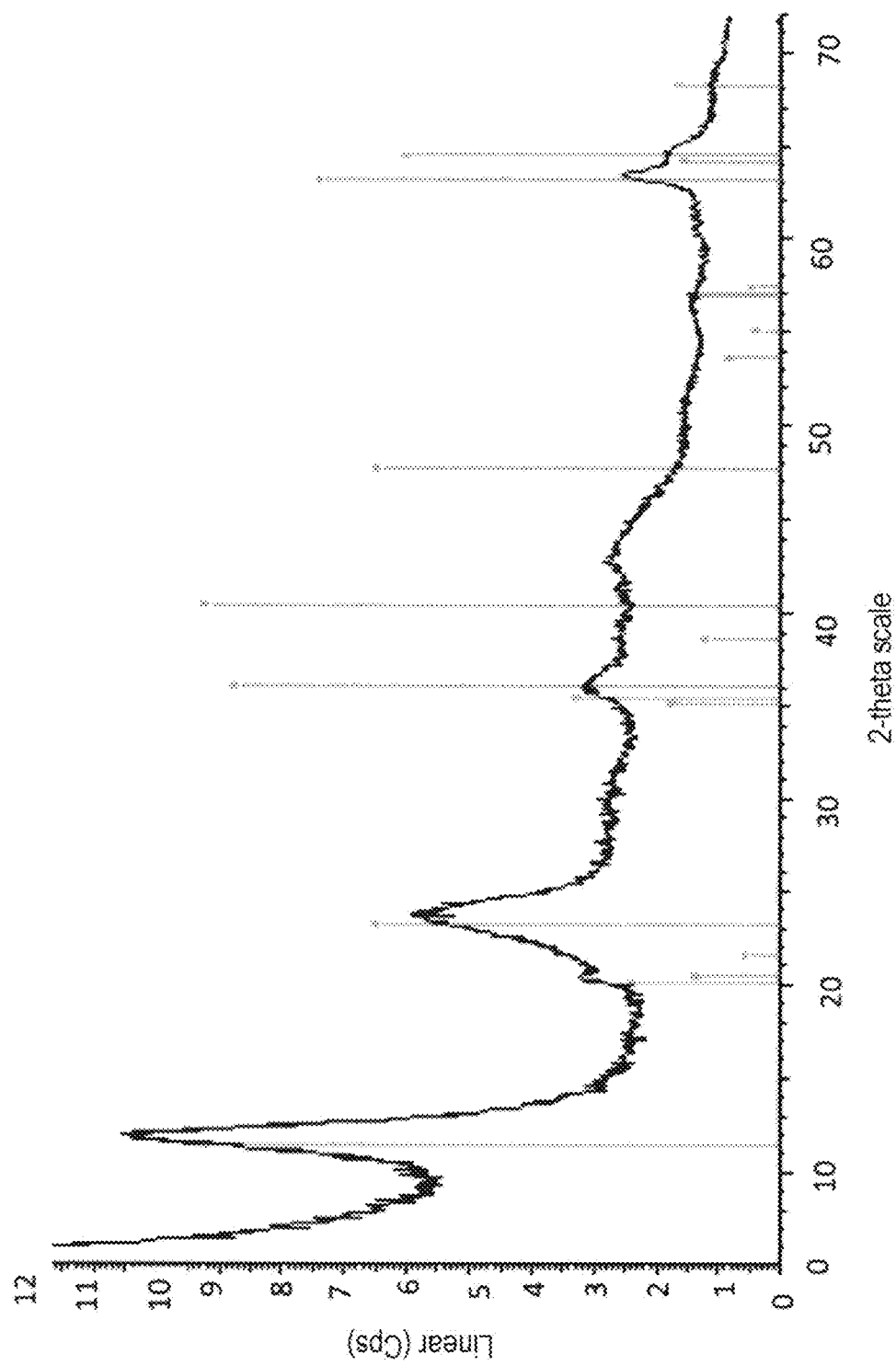
FIGS. 2, 4, 6 and 8 illustrate X-ray diffraction diagrams of solid materials of formula $LiX_x \cdot 2Al(OH)_3 \cdot nH_2O$ with X=Cl, x=1 and n being comprised between 0.01 and 10 obtained as extrudates respectively in Examples 1 and 2 according to the invention and the non-compliant Examples 3 and 4 of the invention.

Extrudates of the solid material of formula $LiCl.2Al(OH)_3,nH_2O$ with n=0.25 having good cohesion and a proper aspect are obtained. A phase $LiCl.2Al(OH)_3,nH_2O$ is detected on the X-ray diffraction diagram of the extrudates of the solid material of formula $LiCl.2Al(OH)_3,nH_2O$ with n=0.25 obtained in Example 1 (FIG. 2).

The obtained extrudates are also characterized by the following measurements:

The elementary analysis shows proper stoichiometry Li/Al/Cl corresponding to the composition of a structure $LiCl.2Al(OH)_3,nH_2O$ Al=21.2% by mass; Li=4.2% mass; Cl=19% by mass.

The obtained extrudates have a specific surface area: $S_{BET}=3$ m$^2$/g.

The extrudates obtained according to Example 1 visually show good cohesion, do not exhibit any or few cracks and both exhibit very good cohesion and very good mechanical strength when they are put into contact with a brine (a destruction percentage of less than 15% during the cohesion test) or with water (destruction percentage of less than 20% during the cohesion test).

Example 2

According to the Invention

A solid material of formula $LiCl.2Al(OH)_3,nH_2O$ with n being comprised between 0.01 and 1 is prepared according to a synthesis method according to the invention, wherein the shaping step is applied by direct extrusion, without any binder.

1/Precipitation of Boehmite AlOOH

In a beaker cooled with an ice bath, a solution containing 326 ml of permuted water and 135.6 g of aluminium chloride hexahydrate ($AlCl_3$) is prepared. Next with magnetic stirring, 67.5 g of sodium hydroxide (NaOH) are added for 30 minutes so as to adjust the pH. The pH attained at the end of the synthesis is 8.5. The temperature is maintained to 20° C. during the whole duration of the step. This cake is suspended in a 3 L beaker with 320 mL of water.

Figure 3:
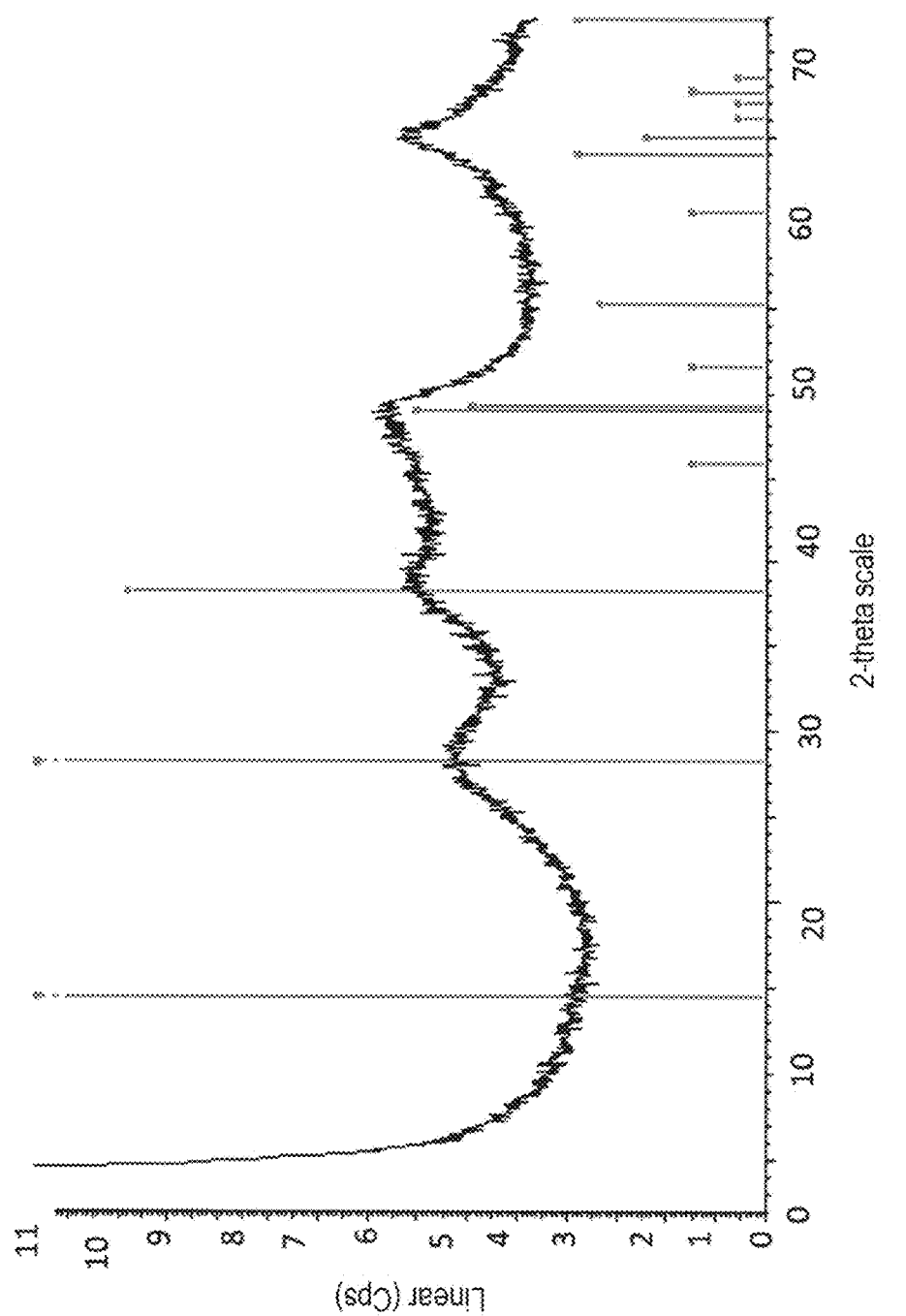

A sample of the obtained precipitate is taken from the reaction medium. XRD (FIG. 3) of the precipitate shows that the precipitate obtained in Example 2 is actually a boehmite precipitate. The boehmite precipitate obtained in Example 2 is not very crystallized.

The size of the crystallites of the obtained boehmite is measured according to Sherrer's method:

Size along [020]=0.9±0.1 (nm); Size along [120]=1.6±0.2 (nm).

2/Addition of Lithium Chloride LiCl.

A solution containing 78.5 g of lithium chloride LiCl provided by Prolabo is prepared and 1,326 ml of water which is added to the repulped cake. This reaction medium is stirred and heated to 80° C. for 2 h.

Filtration and then drying in an oven at 80° C. for 8 h follow the first 2 steps.

The thereby prepared solid material is characterized by the formula $LiCl.2Al(OH)_3,nH_2O$ with n=0.25 according to a synthesis method according to the invention. The step for shaping the obtained slurry is directly carried out after the drying step, without any preliminary kneading step and in the absence of any binder.

The obtained slurry is shaped by means of a piston extruder (MTS), equipped with a cylindrical die with a diameter of 1 mm.

The extrudates obtained at the end of the shaping step are then dried in an oven at 40° C. for 12 h.

The obtained extrudates are then subject to a hydrothermal treatment step in an autoclave comprising water. 10 g of extrudates are placed in a basket placed in a 500 ml autoclave. 20 g of distilled water are placed in the bottom of the autoclave. The extrudates are not in contact with the liquid at the bottom of the autoclave.

The hydrothermal treatment is performed at a temperature of 100° C. for 6 h under an atmosphere saturated with water.

Figure 4:
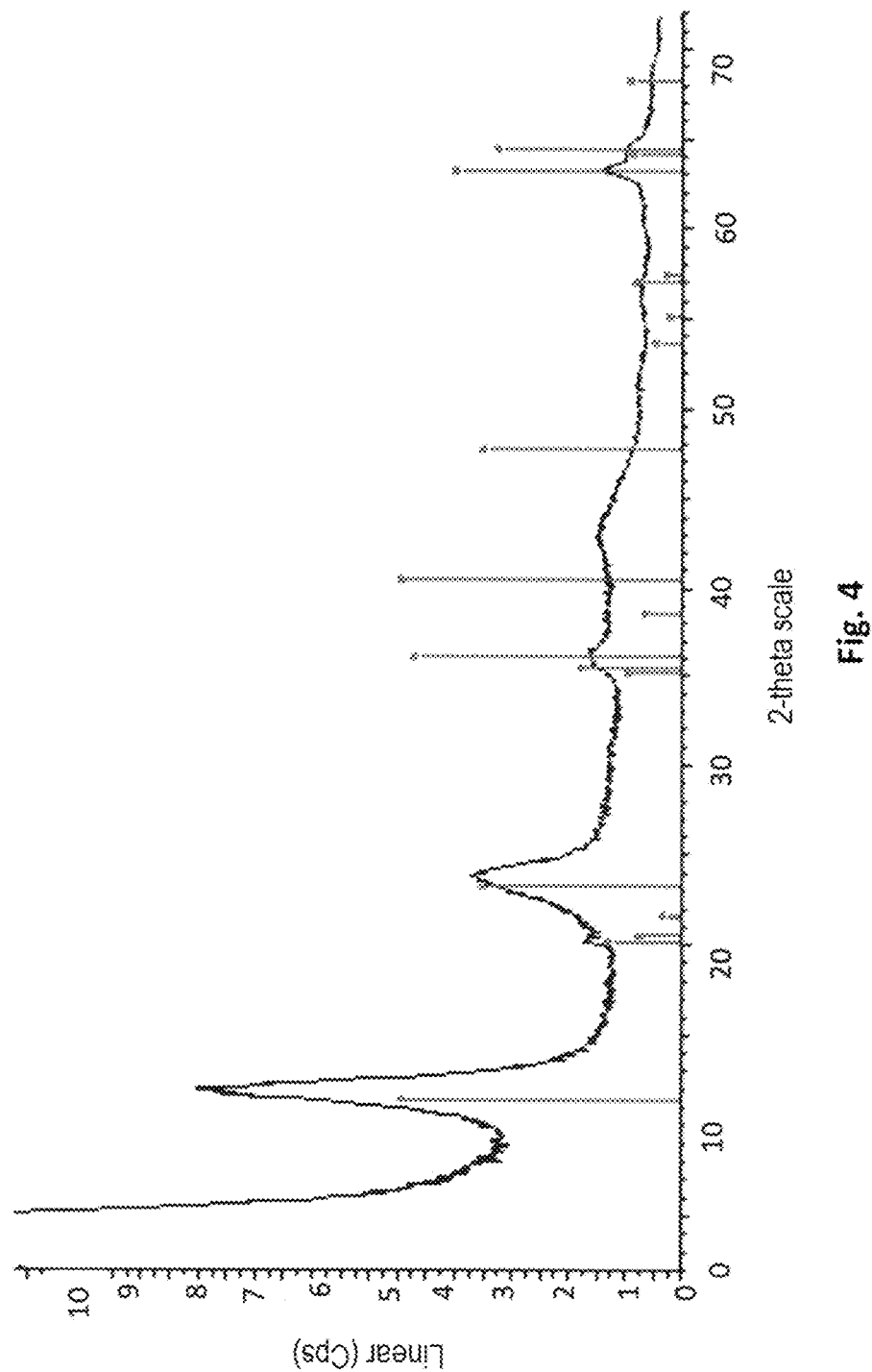

Extrudates of the solid material of formula $LiCl.2Al(OH)_3,nH_2O$ with n=0.25 having good cohesion and a proper aspect are obtained. A phase $LiCl.2Al(OH)_3,nH_2O$ is detected on the X-ray diffraction diagram of the extrudates of the solid material of formula $LiCl.2Al(OH)_3,nH_2O$ with n=0.25 of FIG. 4.

The obtained extrudates are also characterized by the following measurements:

Elementary analysis shows good stoichiometry Li/Al/Cl corresponding to the composition of a structure $LiCl.2Al(OH)_3,nH_2O$ Al=20.00% by mass; Li=4.03% by mass; Cl=20.5% by mass, C=5.87% by mass.

The obtained extrudates have a specific surface area: $S_{BET}=3$ m$^2$/g.

The extrudates obtained according to Example 2 visually show good cohesion, have no or very few cracks and both exhibit very good cohesion and a very good mechanical strength when the latter are put into contact with brine (destruction percentage of less than 15% during the cohesion test) or with water (destruction percentage of less than 20% during the cohesion test).

Example 3

Comparative

A solid material of formula $LiCl.2Al(OH)_3,nH_2O$ with n being comprised between 0.01 and 1, is prepared according to a synthesis method not compliant with the invention, in that the pH at the end of the precipitation of the step for synthesis of boehmite is carried out at a pH greater than 9.5.

1/Precipitation of Boehmite AlOOH

In a beaker cooled with an ice bath, a solution containing 326 ml of permuted water and 135.6 g of aluminium chloride hexahydrate ($AlCl_3$) is prepared. Next with magnetic stirring, 67.5 g of sodium hydroxide (NaOH) are added for 30 minutes so as to adjust the pH. The pH attained at the end of the synthesis is 10. The temperature is maintained to 20° C. for the whole duration of the step. This cake is suspended in a 3 L beaker with 320 mL of water.

Figure 5:
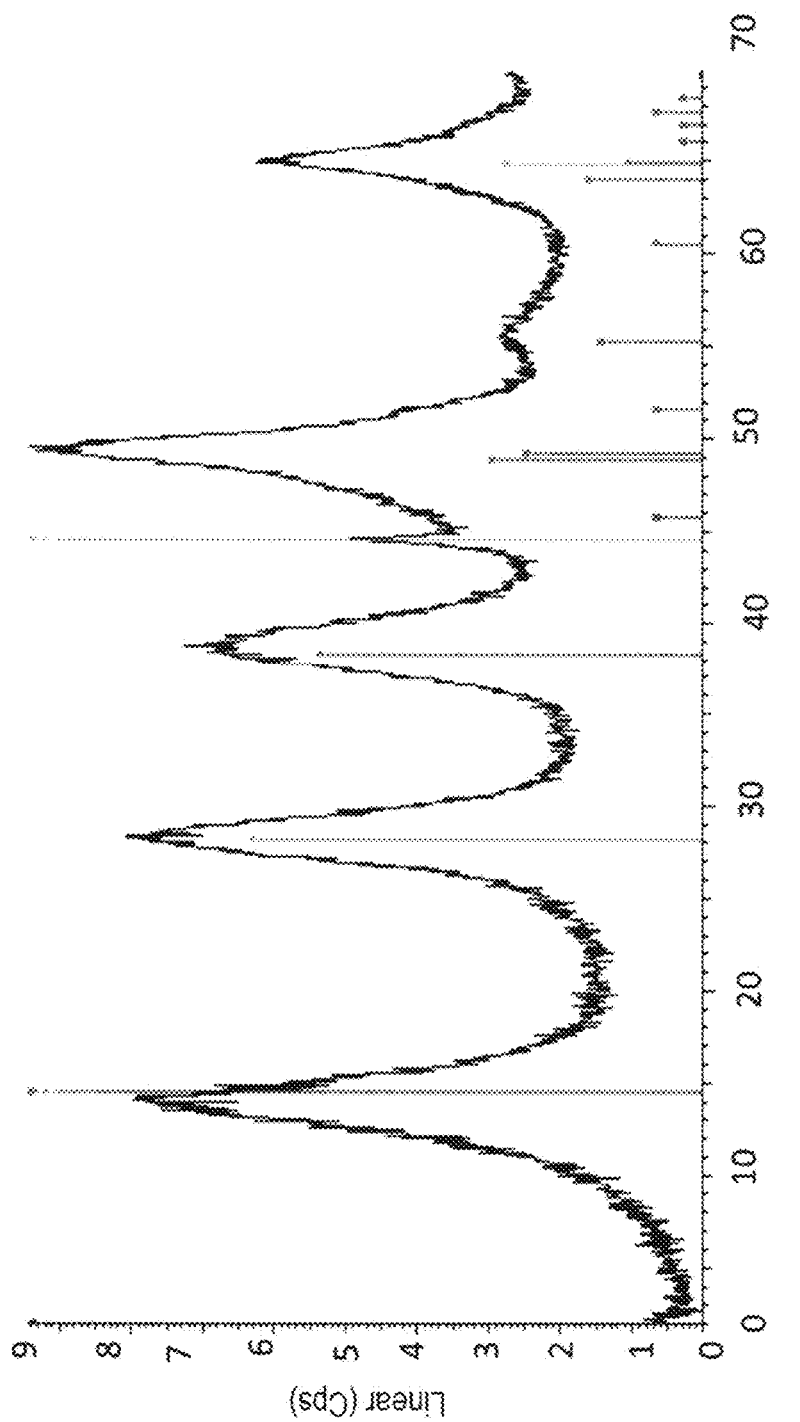

A sample of the obtained precipitate is taken from the reaction medium. The XRD (FIG. 5) of the precipitate shows that the obtained precipitate in Example 3 is actually a boehmite precipitate.

The size of the crystallites of the obtained boehmite is measured according to Sherrer's method: Size along [020]= 2.1±2 (nm); Size along [120]=2.8±3 (nm)

2/Addition of Lithium Chloride LiCl.

A solution containing 78.5 g of lithium chloride LiCl provided by Prolabo and 1,326 ml of water is prepared, which is added to the repulped cake. This reaction medium is stirred and heated to 80° C. for 2 h.

Filtration and then drying in an oven at 80° C. for 8 h follow the first 2 steps.

The step for shaping the obtained slurry is directly carried out after the drying step, without any preliminary kneading step and in the absence of any binder.

The obtained slurry is shaped by means of a piston extruder (MTS), equipped with a cylindrical die with a diameter of 1 mm.

The extrudates obtained at the end of the shaping step are then dried in an oven at 40° C. for 12 h.

The obtained extrudates are then subject to a hydrothermal treatment step in an autoclave comprising water. 10 g of extrudates are placed in a basket placed in a 500 ml autoclave. 20 g of distilled water are placed in the bottom of the autoclave. The extrudates are not in contact with the liquid at the bottom of the autoclave.

The hydrothermal treatment is performed at a temperature of 100° C. for 6 h under an atmosphere saturated with water.

Figure 6:
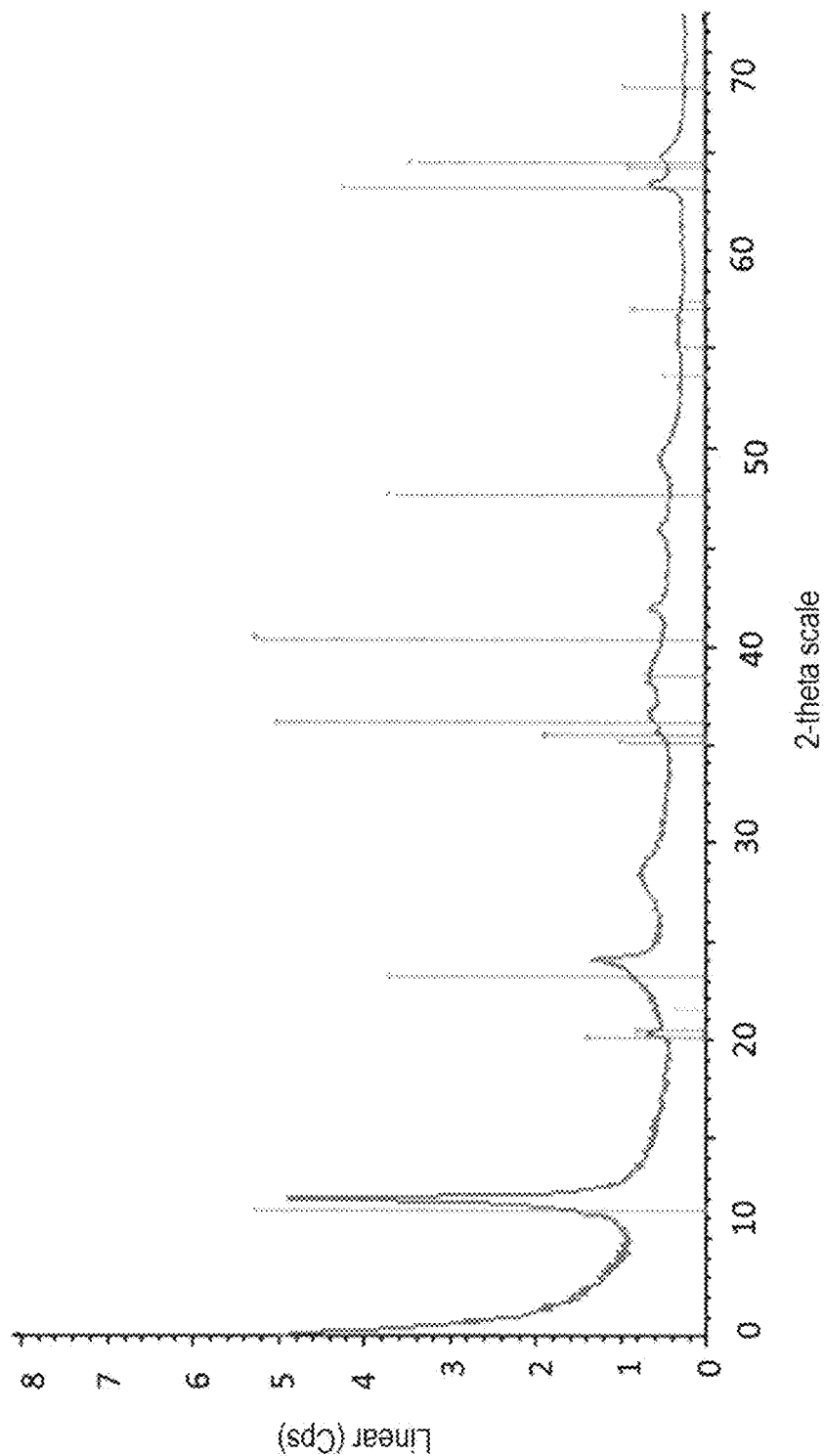

Extrudates of the solid material of formula $LiCl.2Al(OH)_3.nH_2O$ with n=0.25 having good cohesion and a proper aspect are obtained. A phase $LiCl.2Al(OH)_3.nH_2O$ is detected on the X-ray diffraction diagram of the extrudates of the solid material of formula $LiCl.2Al(OH)_3.nH_2O$ with n=0.25 of FIG. 6.

The obtained extrudates are also characterized by the following measurements:

The elementary analysis shows good stoichiometry Li/Al/Cl corresponding to the composition of a structure $LiCl.2Al(OH)_3.nH_2O$ Al=20.00% by mass; Li=4.03% by mass; Cl=20.5% by mass, C=5.87% by mass.

The obtained extrudates have a specific surface area: $S_{BET}=3$ $m^2/g$.

The extrudates obtained according to Example 3 visually show good cohesion, have no or few cracks and have both very good cohesion and very good mechanical strength when the latter are put into contact with brine (destruction percentage of less than 15% during the cohesion test) or with water (destruction percentage of less than 20% during the cohesion test).

Example 4

Comparative

A solid material of formula $LiCl.2Al(OH)_3.nH_2O$ with n being comprised between 0.01 and 1, according to a synthesis method not compliant with the invention, in that the temperature of the step for precipitation of boehmite is achieved at a temperature of 40° C.

1/Precipitation of Boehmite AlOOH

In a beaker cooled by an ice bath, a solution containing 326 ml of permuted water and 135.6 g of aluminium chloride hexahydrate ($AlCl_3$) is prepared. Next, with magnetic stirring, 67.5 g of sodium hydroxide (NaOH) are added for 30 minutes so as to adjust the pH. The pH attained at the end of the synthesis is 8. The temperature is maintained to 40° C. during the whole duration of the step. This cake is suspended in a 3 L beaker with 320 mL of water.

Figure 7:
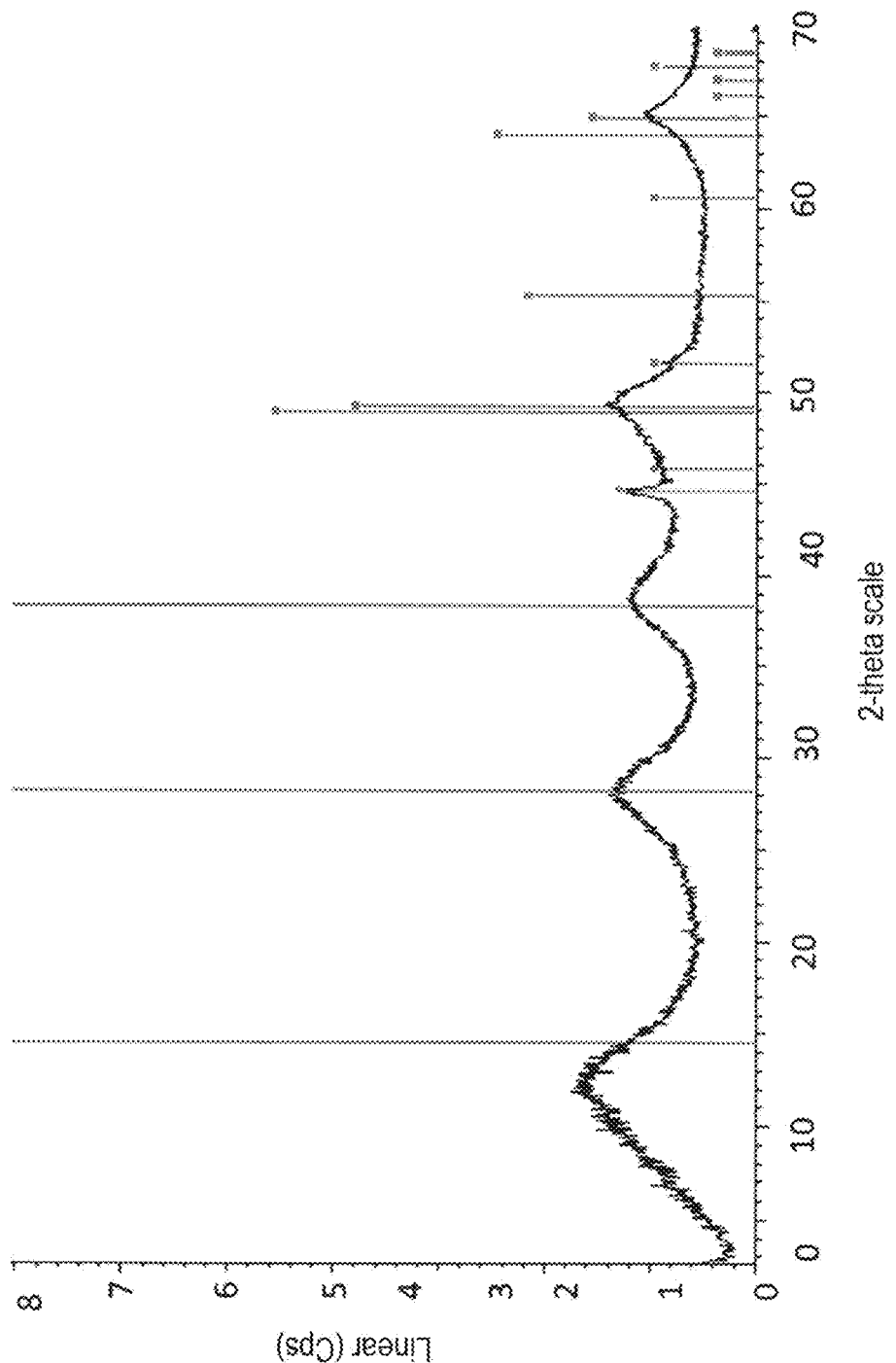

A sample of the obtained precipitate is taken from the reaction medium. The XRD (FIG. 7) of the precipitate shows that the obtained precipitate in Example 4 is actually a boehmite precipitate.

The size of the crystallites of the obtained boehmite is measured according to Sherrer's method: Size along [020]= 1.9±3 (nm); Size along [120]=2.6±2 (nm)

2/Addition of Lithium Chloride LiCl.

A solution containing 78.5 g of lithium chloride LiCl provided by Prolabo and 1,326 ml of water is prepared, which is added to the repulped cake. This reaction medium is stirred and heated to 80° C. for 2 h.

A filtration and then drying in an oven at 80° C. for 8 h follow the first 2 steps.

The step for shaping the obtained slurry is directly carried out after the drying step, without any preliminary kneading step and in the absence of any binder.

The obtained slurry is shaped by means of a piston extruder (MTS), equipped with a cylindrical die with a diameter of 1 mm.

The extrudates obtained at the end of the shaping step are then dried in an oven at 40° C. for 12 h.

The obtained extrudates are then subject to a hydrothermal treatment step in an autoclave comprising water. 10 g of extrudates are placed in a basket placed in a 500 ml autoclave. 20 g of distilled water are placed in the bottom of the autoclave. The extrudates are not in contact with the liquid at the bottom of the autoclave.

The hydrothermal treatment is performed at a temperature of 100° C. for 6 h under an atmosphere saturated with water.

Figure 8:
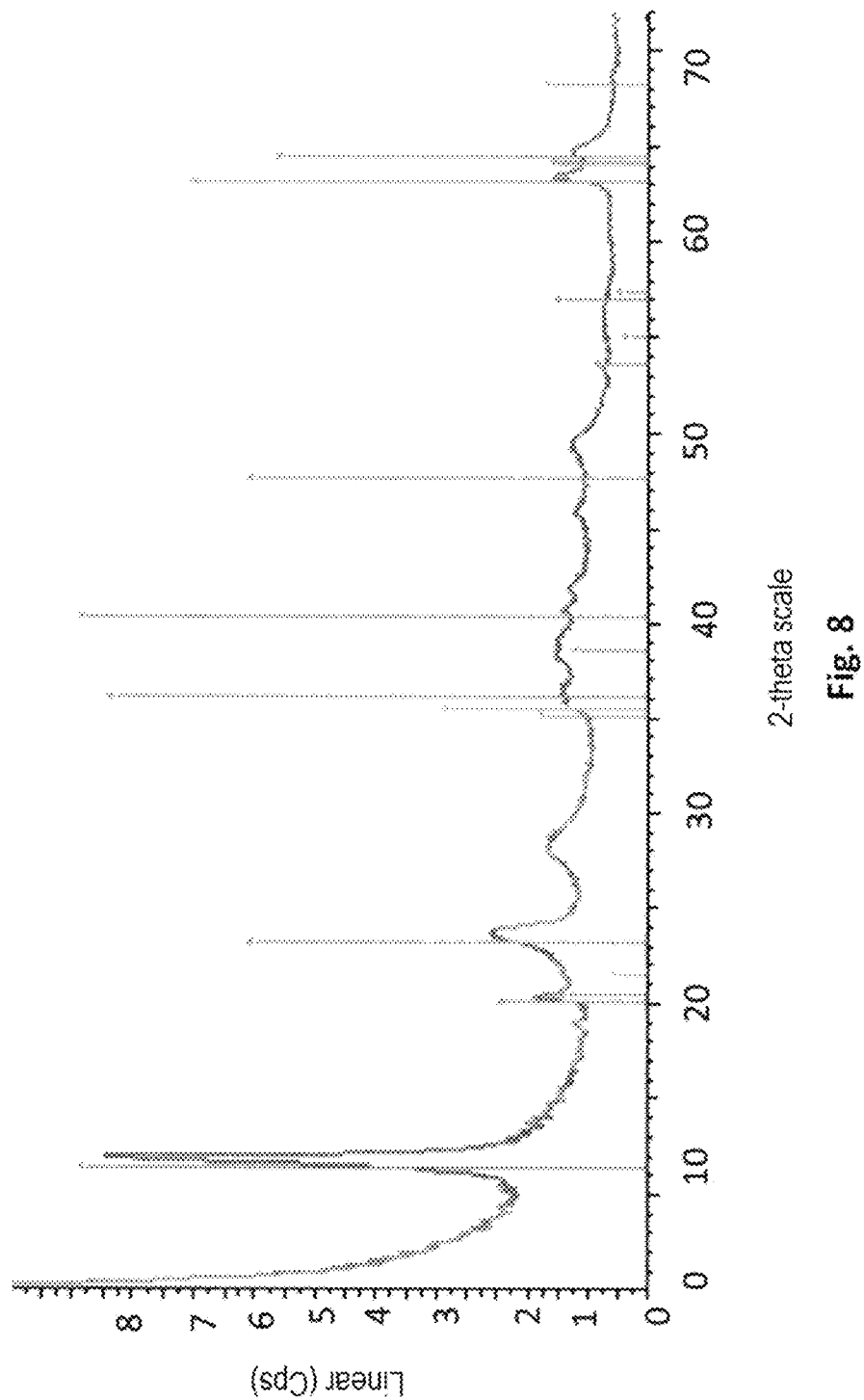

Extrudates of the solid material of formula $LiCl.2Al(OH)_3.nH_2O$ with n=0.25 having good cohesion and a proper aspect are obtained. A phase $LiCl.2Al(OH)_3.nH_2O$ is detected on the X-ray diffraction diagram of the extrudates of the solid material of formula $LiCl.2Al(OH)_3.nH_2O$ with n=0.25 of FIG. 8.

The obtained extrudates are also characterized by the following measurements:

Elementary analysis shows good stoichiometry Li/Al/Cl corresponding to the composition of a structure $LiCl.2Al(OH)_3.nH_2O$ Al=20.00% by mass; Li=4.03% by mass; Cl=20.51% by mass.

The obtained extrudates have a specific surface area: $S_{BET}=2$ $m^2/g$.

The extrudates obtained according to Example 4 visually show good cohesion, have no or few cracks and both have very good cohesion and very good mechanical strength when the latter are put into contact with a brine (destruction percentage of less than 15% during the cohesion test) or with water (destruction percentage of less than 20% during the cohesion test).

Example 5

Test of the Adsorption Capacity and of the Adsorption Kinetics

The adsorption kinetics of lithium by the extrudates and their adsorption capacity is tested by producing a piercing curve also called a leak curve or saturation curve in a column. A saturation curve is produced for each of the extrudates obtained in Examples 1 to 4:
- 15 g of solid are placed in a column
- 10 column volumes of a saline solution of lithium chloride (LiCl) at 0.02 mol/L cross the column in a closed circuit until a stable lithium concentration is attained in solution
- A natural solution containing about 0.06 mol/L of lithium crosses the column by flowing upwards, at a rate of 6 BV/h, i.e. six times the volume occupied by the bed of the extrudates within one hour.
- Lithium concentration is measured at the outlet of the column depending on the solution volume which has passed.

Figure 9:
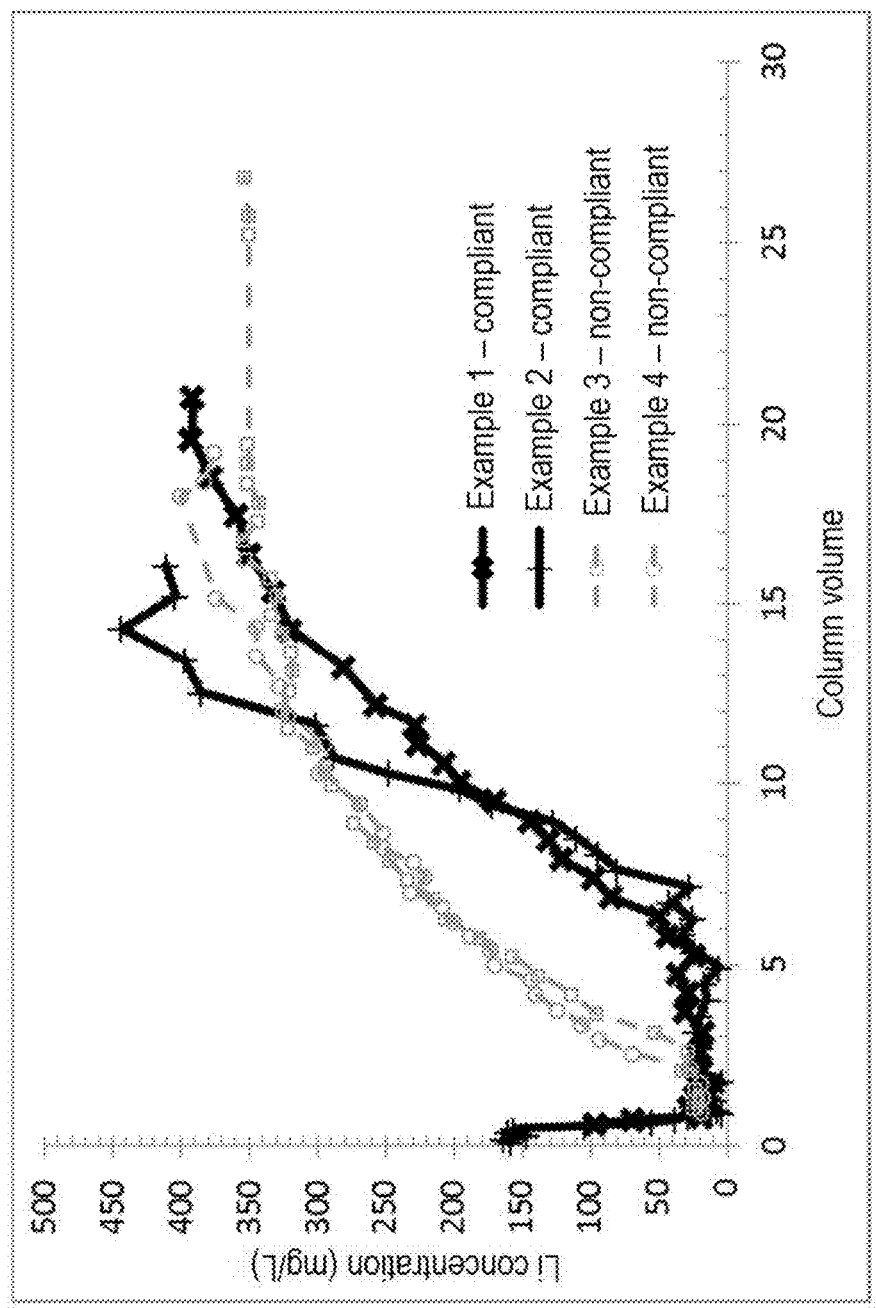
FIG. 9 illustrates the saturation curve according to Example 5 produced from the extrudates obtained in Examples 1 to 4.

FIG. 9 illustrates the saturation curves obtained for each of the extrudates obtained in the Examples according to the invention 1 and 2 and those not compliant with the invention 3 and 4.

The extrudates obtained according to Examples 1 and 2 according to the invention are compared with those obtained in the Examples 3 and 4 obtained according to preparation methods non-compliant with the invention. The extrudates of Examples 1 and 2 obtained according to the invention exhibit a lithium leak occurring at greater brine volumes having cast. Their adsorption capacities of lithium are respectively 5.8 and 6.2 mg(Li)/g (dry solid), to be compared with 1.7 and 4.3 mg(Li)/g (dry solid) for the solids obtained according to Examples 3 and 4, according to preparation methods non-compliant with the invention.

The invention claimed is:

1. A method for preparing a crystallized solid material of formula $LiX_x \cdot 2Al(OH)_3 \cdot nH2O$ with n being comprised between 0.01 and 10, x being equal to 1 when X is an anion selected from among chloride, hydroxide and nitrate anions, and x being equal to 0.5 when X is an anion selected from among sulfate and carbonate anions, said method comprising:
   a) precipitating boehmite in an aqueous medium, wherein the precipitation comprises contacting at least one basic precursor; and at least one acid precursor, wherein at least one of the basic or acid precursors comprises aluminium, thereby obtaining a suspension of boehmite, said precipitating being performed at a temperature comprised between 5 and 35° C., and wherein the amount of the basic precursor gives a pH at the end of precipitation in the reaction medium comprised between 7.5 and 9.5,
   b) washing and filtering the boehmite precipitate obtained in a),
   c) putting the precipitate obtained in b) in contact with at least one lithium source thereby obtaining a suspension,
   d) filtering the suspension obtained in c) thereby obtaining a slurry,
   e) drying the slurry obtained at the end of d) at a temperature comprised between 20 and 80° C.,
   f) shaping said dried slurry,
   g) drying the shaped material obtained at the end of f) at a temperature comprised between 20 and 200° C., and
   h) hydrothermally treating the dry shaped material obtained at the end of g) at a temperature comprised between 50 and 200° C.

2. The method according to claim 1, wherein said basic precursor is selected from the group consisting of sodium aluminate, potassium aluminate, ammonia, sodium hydroxide, potassium hydroxide, and any mixture thereof.

3. The method according to claim 1, wherein said basic precursor is sodium hydroxide (NaOH).

4. The method according to claim 1, wherein said acid precursor is selected from the group consisting of aluminium sulfate, aluminium chloride, aluminium nitrate, sulfuric acid, hydrochloric acid, nitric acid, and any mixture thereof.

5. The method according to claim 1, wherein said acid precursor is aluminium trichloride ($AlCl_3$).

6. The method according to claim 1, wherein said precipitating is performed at a temperature comprised between 10 and 25° C.

7. The method according to claim 1, wherein the amount of the basic precursor gives a pH at the end of precipitation in the reaction medium comprised between 7.7 and 8.8.

8. The method according to claim 1, wherein said lithium source is selected from the group consisting of lithium chloride (LiCl), lithium hydroxide (LiOH), lithium nitrate ($LiNO_3$), lithium sulfate ($Li_2SO_4$) and lithium carbonate ($Li_2CO_3$), and any a mixture thereof.

9. The method according to claim 8, wherein said lithium source is lithium chloride (LiCl).

10. The method according to claim 1, wherein said shaping is achieved by extrusion.

11. The method according to claim 10, wherein said shaping is directly applied after the drying.

* * * * *